(12) United States Patent
Suga et al.

(10) Patent No.: US 11,996,243 B2
(45) Date of Patent: May 28, 2024

(54) CERAMIC ELECTRONIC COMPONENT AND SUBSTRATE ARRANGEMENT

(71) Applicant: TAIYO YUDEN CO., LTD., Tokyo (JP)

(72) Inventors: Yasutomo Suga, Tokyo (JP); Kimio Fujita, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 54 days.

(21) Appl. No.: 17/722,184

(22) Filed: Apr. 15, 2022

(65) Prior Publication Data

US 2022/0344098 A1   Oct. 27, 2022

(30) Foreign Application Priority Data

Apr. 21, 2021   (JP) ................. 2021-071679

(51) Int. Cl.
*H01G 4/232*   (2006.01)
*H01G 2/06*   (2006.01)
(Continued)

(52) U.S. Cl.
CPC .............. *H01G 4/30* (2013.01); *H01G 2/065* (2013.01); *H01G 4/008* (2013.01); *H01G 4/012* (2013.01); *H01G 4/232* (2013.01); *H01G 4/12* (2013.01)

(58) Field of Classification Search
CPC ............ H01G 4/12; H01G 2/065; H01G 2/24; H01G 4/008; H01G 4/012; H01G 4/20;
(Continued)

(56) References Cited

U.S. PATENT DOCUMENTS

2008/0310077 A1   12/2008   Itamura et al.
2016/0093438 A1*   3/2016   Sasabayashi ............ H01G 4/12
361/301.4
(Continued)

FOREIGN PATENT DOCUMENTS

CN   106206011 A   12/2016
JP   2009-27148 A   2/2009
(Continued)

OTHER PUBLICATIONS

Chinese Office Action dated Jan. 19, 2024, in a counterpart Chinese patent application No. 202210421110.X. (A machine translation (not reviewed for accuracy) attached.).

*Primary Examiner* — Michael P McFadden
(74) *Attorney, Agent, or Firm* — CHEN YOSHIMURA LLP

(57) ABSTRACT

A ceramic electronic component includes an element body having a first inner electrode exposed at a first end face of the element body, and a second inner electrode exposed at a second end face of the element body. The ceramic electronic component also includes a first outer electrode formed on the first end face and its neighboring faces of the element body. The first outer electrode includes two side portions and a middle portion on each of top and bottom faces of the element body such that the middle portion extends inwardly towards a center of the element body more than the two side portions from the first end face. The ceramic electronic component also includes a second outer electrode having the same dimensions as the first outer electrode on the second end face and its neighboring faces of the element body.

14 Claims, 15 Drawing Sheets

(51) Int. Cl.
*H01G 4/008* (2006.01)
*H01G 4/012* (2006.01)
*H01G 4/12* (2006.01)
*H01G 4/30* (2006.01)

(58) Field of Classification Search
CPC .......... H01G 4/232; H01G 4/30; H01G 4/306; H01G 4/33; H01G 4/1227; H01G 4/248
See application file for complete search history.

(56) References Cited

U.S. PATENT DOCUMENTS

| | | | |
|---|---|---|---|
| 2016/0211074 A1 | 7/2016 | Gu et al. | |
| 2017/0278631 A1* | 9/2017 | Choi | H01G 4/30 |
| 2019/0027312 A1* | 1/2019 | Muramatsu | H01G 4/12 |
| 2019/0287720 A1* | 9/2019 | Mori | H01G 4/232 |
| 2020/0066447 A1* | 2/2020 | Murai | H01G 4/30 |

FOREIGN PATENT DOCUMENTS

| | | | | |
|---|---|---|---|---|
| JP | 2010-056202 A | 3/2010 | | |
| WO | WO-2016171261 A1 * | 10/2016 | ............... | H01G 2/06 |

* cited by examiner

FIG. 13

| L | W | T | E | G | EW1 | EW2 | EW2≥0.05 | G/EW1 | G/EW1≥0.22 | E/T | E/T≥1.25 | SHORT-CIRCUITING COUNT | EVALUATION | CHIP STANDING COUNT | EVALUATION | EVALUATION |
|---|---|---|---|---|---|---|---|---|---|---|---|---|---|---|---|---|
| 0.2 | 0.5 | 0.06 | 0.1 | 0.1 | 0.5 | 0 | NG | 0.20 | NG | 1.67 | GOOD | 4/1000 | NG | 0/1000 | GOOD | NG |
| 0.3 | 0.5 | 0.06 | 0.1 | 0.1 | 0.45 | 0.025 | NG | 0.22 | GOOD | 1.67 | GOOD | 2/1000 | NG | 0/1000 | GOOD | NG |
| 0.3 | 0.5 | 0.06 | 0.1 | 0.1 | 0.4 | 0.05 | GOOD | 0.25 | GOOD | 1.67 | GOOD | 0/1000 | GOOD | 0/1000 | GOOD | GOOD |
| 0.3 | 0.5 | 0.06 | 0.1 | 0.1 | 0.35 | 0.075 | GOOD | 0.29 | GOOD | 1.67 | GOOD | 0/1000 | GOOD | 0/1000 | GOOD | GOOD |
| 0.3 | 0.5 | 0.06 | 0.1 | 0.1 | 0.3 | 0.1 | GOOD | 0.33 | GOOD | 1.67 | GOOD | 0/1000 | GOOD | 0/1000 | GOOD | GOOD |
| 0.3 | 0.5 | 0.06 | 0.07 | 0.16 | 0.35 | 0.075 | GOOD | 0.46 | GOOD | 1.17 | NG | 0/1000 | GOOD | 2/1000 | NG | NG |
| 0.3 | 0.5 | 0.06 | 0.09 | 0.12 | 0.35 | 0.075 | GOOD | 0.34 | GOOD | 1.50 | GOOD | 0/1000 | GOOD | 0/1000 | GOOD | GOOD |
| 0.3 | 0.5 | 0.06 | 0.11 | 0.08 | 0.35 | 0.075 | GOOD | 0.23 | GOOD | 1.83 | GOOD | 0/1000 | GOOD | 0/1000 | GOOD | GOOD |
| 0.3 | 0.5 | 0.06 | 0.12 | 0.06 | 0.35 | 0.075 | GOOD | 0.17 | NG | 2.00 | GOOD | 7/1000 | NG | 0/1000 | GOOD | NG |
| 0.3 | 0.4 | 0.06 | 0.1 | 0.1 | 0.4 | 0 | NG | 0.25 | GOOD | 1.67 | GOOD | 2/1000 | NG | 0/1000 | GOOD | NG |
| 0.3 | 0.45 | 0.06 | 0.1 | 0.1 | 0.45 | 0 | NG | 0.22 | GOOD | 1.67 | GOOD | 2/1000 | NG | 0/1000 | GOOD | NG |
| 0.3 | 0.5 | 0.06 | 0.1 | 0.1 | 0.5 | 0 | NG | 0.20 | NG | 1.67 | GOOD | 1/1000 | GOOD | 0/1000 | GOOD | NG |
| 0.3 | 0.6 | 0.06 | 0.1 | 0.1 | 0.6 | 0 | NG | 0.17 | NG | 1.67 | GOOD | 6/1000 | NG | 0/1000 | GOOD | NG |
| 0.3 | 0.4 | 0.06 | 0.1 | 0.1 | 0.3 | 0.05 | GOOD | 0.33 | GOOD | 1.67 | GOOD | 0/1000 | GOOD | 0/1000 | GOOD | GOOD |
| 0.3 | 0.45 | 0.06 | 0.1 | 0.1 | 0.35 | 0.05 | GOOD | 0.29 | GOOD | 1.67 | GOOD | 0/1000 | GOOD | 0/1000 | GOOD | GOOD |
| 0.3 | 0.5 | 0.06 | 0.1 | 0.1 | 0.4 | 0.05 | GOOD | 0.25 | GOOD | 1.67 | GOOD | 0/1000 | GOOD | 0/1000 | GOOD | GOOD |
| 0.3 | 0.6 | 0.06 | 0.1 | 0.1 | 0.5 | 0.05 | GOOD | 0.20 | NG | 1.67 | GOOD | 1/1000 | GOOD | 0/1000 | GOOD | NG |
| 0.3 | 0.5 | 0.05 | 0.1 | 0.1 | 0.4 | 0.05 | GOOD | 0.25 | GOOD | 2.00 | GOOD | 0/1000 | GOOD | 0/1000 | GOOD | GOOD |
| 0.3 | 0.5 | 0.07 | 0.1 | 0.1 | 0.4 | 0.05 | GOOD | 0.25 | GOOD | 1.43 | GOOD | 0/1000 | GOOD | 0/1000 | GOOD | GOOD |
| 0.3 | 0.5 | 0.08 | 0.1 | 0.1 | 0.4 | 0.05 | GOOD | 0.25 | GOOD | 1.25 | GOOD | 0/1000 | GOOD | 2/1000 | NG | NG |
| 0.3 | 0.5 | 0.09 | 0.1 | 0.1 | 0.4 | 0.05 | GOOD | 0.25 | GOOD | 1.11 | NG | 0/1000 | GOOD | 1/1000 | GOOD | NG |
| 0.3 | 0.5 | 0.06 | 0.07 | 0.16 | 0.4 | 0.05 | GOOD | 0.40 | GOOD | 1.17 | NG | 0/1000 | GOOD | 0/1000 | GOOD | NG |
| 0.3 | 0.5 | 0.06 | 0.09 | 0.12 | 0.4 | 0.05 | GOOD | 0.30 | GOOD | 1.50 | GOOD | 0/1000 | GOOD | 0/1000 | GOOD | GOOD |
| 0.3 | 0.5 | 0.06 | 0.12 | 0.06 | 0.4 | 0.05 | GOOD | 0.15 | NG | 2.00 | GOOD | 4/1000 | NG | 3/1000 | NG | NG |
| 0.3 | 0.5 | 0.08 | 0.07 | 0.16 | 0.4 | 0.05 | GOOD | 0.40 | GOOD | 0.88 | NG | 0/1000 | GOOD | 1/1000 | GOOD | NG |
| 0.3 | 0.5 | 0.08 | 0.09 | 0.12 | 0.4 | 0.05 | GOOD | 0.30 | GOOD | 1.13 | NG | 0/1000 | GOOD | 0/1000 | GOOD | NG |
| 0.3 | 0.5 | 0.08 | 0.1 | 0.1 | 0.4 | 0.05 | GOOD | 0.25 | GOOD | 1.25 | GOOD | 0/1000 | GOOD | 0/1000 | GOOD | GOOD |
| 0.3 | 0.5 | 0.08 | 0.12 | 0.06 | 0.3 | 0.05 | GOOD | 0.15 | NG | 1.50 | GOOD | 3/1000 | NG | 0/1000 | GOOD | NG |

CERAMIC ELECTRONIC COMPONENT AND SUBSTRATE ARRANGEMENT

FIELD OF THE INVENTION

The present invention relates to a ceramic electronic component and a substrate arrangement.

DESCRIPTION OF THE RELATED ART

As electronic devices become smaller and more sophisticated, a mounting density of electronic components mounted on a mounting board (substrate) is increasing. In order to reduce the electronic components to be mounted on an ordinary mounting surface, on which IC (Integrated Circuit) chips, etc., are mounted, the height of a multilayer ceramic capacitor is reduced and the multilayer ceramic capacitor is mounted on an surface opposite to the ordinary mounting surface of the substrate. This capacitor may be referred to as an LSC (land-side capacitor). This configuration not only reduces the electronic components, including the IC chips, to be mounted on the ordinary mounting surface of the substrate, but also shortens the wiring length to the multilayer ceramic capacitor, which is expected to lower an ESL (equivalent series resistance).

JP-A-2009-27148 discloses an L-W reversed type multilayer ceramic capacitor to further reduce the ESL. The L-W reversed type multilayer ceramic capacitor has a width longer than a length. The L-W reversed type multilayer ceramic capacitor has six faces (i.e., two opposite end faces, two lateral faces, a top face and a bottom face). A ceramic layer is formed on the end faces and the lateral faces of the capacitor. Two outer electrodes are formed on the opposite end faces, respectively. The outer electrodes are spaced from each other in the length direction of the capacitor. The two lateral faces are spaced from each other in the width direction of the capacitor. In the L-W reversed type multilayer ceramic capacitor, the size (W dimension) of the ceramic layer on the respective end face of the capacitor is larger than the size of the ceramic layer on the respective lateral face (L dimension). In such a L-W reversed type multilayer ceramic capacitor, a current path inside the capacitor body becomes wide and short, and the ESL decreases.

SUMMARY OF THE INVENTION

In the L-W reversed type multilayer ceramic capacitor, if the length of the outer electrode is elongated and a capacitor size (chip size) decreases, it becomes difficult to sufficiently ensure an interval between the outer electrodes of the capacitor. Therefore, if a rotational misalignment occurs during the mounting of the capacitor (chip) on a mounting substrate, the electrode of the capacitor spans the gap between land electrodes of the mounting substrate and short-circuiting may occur.

If the interval between the outer electrodes is increased to prevent the occurrence of short-circuiting due to the rotational misalignment during the mounting of the capacitor chip, the length of the respective outer electrode becomes short. If the length of the respective outer electrode becomes short, a solder stress generated at the time of reflow during the mounting of the capacitor chip may cause the capacitor chip to stand on the mounting substrate.

Therefore, it is an object of the present invention to provide a ceramic electronic component that can avoid short-circuiting between two land electrodes on a mounting substrate when the ceramic electronic component is mounted on the mounting substrate. It is another object of the present invention to provide a device (substrate arrangement) that includes such ceramic electronic component mounted on a mounting substrate.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a ceramic electronic component that includes an element body, a first outer electrode and a second outer electrode. The element body has a first end face, a second end face parallel to the first end face, a top face, a bottom face, a first lateral face, and a second lateral face parallel to the first lateral face. The element body includes a dielectric, a first inner electrode exposed at the first end face, and a second inner electrode exposed at the second end face. The first outer electrode is formed on the first end face. The first outer electrode extends from the first end face onto neighboring areas of at least one of the top face, the bottom face, the first lateral face, and the second lateral face of the element body, thereby having an extended portion. The first outer electrode is connected to the first inner electrode. The extended portion of the first outer electrode includes two side portions and a middle portion between the two side portions such that the middle portion extends inwardly towards a center of the element body more than the two side portions from the first end face in a direction perpendicular to the first end face. The second outer electrode is formed on the second end face. The second outer electrode extends from the second end face onto neighboring areas of at least one of the top face, the bottom face, the first lateral face, and the second lateral face of the element body, thereby having an extended portion. The second outer electrode is connected to the second inner electrode. The extended portion of the second outer electrode includes two side portions and a middle portion between the two side portions such that the middle portion extends inwardly towards the center of the element body more than the two side portions from the second end face in a direction perpendicular to the second end face. The second outer electrode does not overlap the first outer electrode on the element body. The ceramic electronic component satisfies the following conditions:

$L < W$,
$L \leq 0.4$ mm,
$W \leq 0.8$ mm,
$T \leq 100$ μm,
$EW2 \geq 0.05$ mm,
$G/EW1 \geq 0.22$, and
$E/T \geq 1.25$.

where L represents an outer lengthwise dimension of the ceramic electronic component in the direction perpendicular to the first end face, W represents an outer widthwise dimension of the ceramic electronic component in a direction in parallel to the first end face, T represents an outer height dimension of the ceramic electronic component in a direction perpendicular to the top and bottom faces of the element body, EW1 represents a dimension of the middle portion of the first outer electrode in the direction in parallel to the first end face, EW2 represents a dimension of each of the two side portions of the first outer electrode in the direction in parallel to the first end face, G represents a distance between the middle portion of the first outer electrode and the middle portion of the second outer electrode in the direction perpendicular to the first end face, and E represents a dimension of the middle portion of the first outer electrode in the direction perpendicular to the first end face, as measured from an edge of the first outer electrode on the first end face of the element body.

The top and bottom faces of the element body may be parallel to the first inner electrode. The respective extended portions of the first and second outer electrodes may be on at least one of the top and bottom faces of the elements body. The ceramic electronic component may satisfy following conditions on only one of the top and bottom faces of the element body: $EW2 \geq 0.05$ mm, $G/EW1 \geq 0.22$, and $E/T \geq 1.25$.

The first inner electrode may be provided in a plurality. The second inner electrode may be provided in a plurality. The first inner electrodes and the second inner electrodes may be alternately laminated in the element body.

The ceramic electronic component may further include a floating electrode arranged in the element body. The first inner electrode may not overlap the second inner electrode in the element body. The floating electrode may overlap the first inner electrode and the second inner electrode.

The extended portion of the first outer electrode may be on neighboring areas of the top and bottom faces of the element body. The extended portion of the second outer electrode may be on neighboring areas of the top and bottom faces of the element body.

Alternatively, the extended portion of the first outer electrode may be on a neighboring area of only one of the top and bottom faces of the element body, and the extended portion of the second outer electrode may be on a neighboring area of only one of the top and bottom faces of the element body.

The dimension E of the first outer electrode on one of the top and bottom faces of the element body may be greater than the dimension E of the first outer electrode on the other of the top and bottom faces of the element body. The second outer electrode may have same dimensions as the first outer electrode on the top and bottom faces of the element body.

Each of the first outer electrode and the second outer electrode on the above-mentioned one of the top and bottom faces of the element body may include a composite film made of a sputtered film and a sintered film, and a plating film formed on the composite film. Each of the first outer electrode and the second outer electrode on the other of the top and bottom faces of the element body may include a sintered film and a plating film formed on the sintered film.

The extended portion of each of the first and second outer electrodes may have a tapered shape such that a width thereof is progressively narrowed towards the center of the element body.

The first outer electrode may include a first underlayer formed on the element body and connected to the first inner electrode. The first underlayer may contain a metal. The first outer electrode may also include a first plating layer formed on the first underlayer. The second outer electrode may include a second underlayer formed on the element body and connected to the second inner electrode. The second underlayer may contain a metal. The second outer electrode may also include a second plating layer formed on the second underlayer.

In another aspect, the present disclosure provides a ceramic electronic component that includes an element body, a first outer electrode and a second outer electrode. The element body has a first end face, a second end face parallel to the first end face, a top face perpendicular to the first end face, a bottom face perpendicular to the first end face, a first lateral face perpendicular to the first end face, and a second lateral face perpendicular to the first end face and parallel to the first lateral face. The element body includes a dielectric, a first inner electrode exposed at the first end face, and a second inner electrode exposed at the second end face. The first outer electrode is formed on the first end face, the top face, the bottom face, the first lateral face, and the second lateral face of the element body. The first outer electrode is connected to the first inner electrode. The first outer electrode includes two side portions and a middle portion between the two side portions on each of the top and bottom faces of the element body such that the middle portion extends inwardly towards a center of the element body more than the two side portions from the first end face in a direction perpendicular to the first end face. The second outer electrode is formed on the second end face, the top face, the bottom face, the first lateral face and the second lateral face of the element body. The second outer electrode is connected to the second inner electrode. The second outer electrode includes two side portions and a middle portion between the two side portions on each of the top and bottom faces of the element body such that the middle portion extends inwardly towards the center of the element body more than the two side portions from the second end face in a direction perpendicular to the second end face. The second outer electrode does not overlap the first outer electrode on any of the top face, the bottom face, the first lateral face, and the second lateral face of the element body.

A dimension of the middle portion of the first outer electrode along the direction perpendicular to the first end face may be greater than a dimension of the first outer electrode on each of the first and second lateral faces of the element body along the direction perpendicular to the first end face. A dimension of the middle portion of the second outer electrode along the direction perpendicular to the second end face may be greater than a dimension of the second outer electrode on each of the first and second lateral faces of the element body along the direction perpendicular to the second end face.

In still another aspect, the present disclosure provides a device that includes a mounting substrate having a first face and a second face that is opposite to the first face. The mounting substrate includes a first land electrode and a second land electrode on the first face. The device also includes the above-described ceramic electronic component, mounted on the first face of the mounting substrate such that the first land electrode is connected to the first outer electrode of the ceramic electronic component via a first solder layer and that the second the second land electrode is connected to the second outer electrode of the ceramic electronic component via a second solder layer.

A distance between the first land electrode and the second land electrode may be equal to a distance between the middle portion of the first outer electrode and the middle portion of the second outer electrode.

The device may further include a solder ball formed on the first face of the mounting substrate.

The device may further include a second mounting substrate that is connected to the mounting substrate by the solder ball such that a gap is formed between the second mounting substrate and the mounting substrate to receive the ceramic electronic component in the gap.

According to at least some of the above-described aspects of the present invention, the ceramic electronic component can avoid short-circuiting between two land electrodes on the mounting substrate when the ceramic electronic component is mounted on the mounting substrate because each of the first and second outer electrodes has a smaller dimension at the side portions than the middle portion. Thus, it is possible to improve the stability at the time of mounting the ceramic electronic component on the mounting substrate.

It is to be understood that both the foregoing general description and the following detailed description are exemplary and explanatory, and are intended to provide further explanation of the invention as claimed.

BRIEF DESCRIPTION OF THE DRAWINGS

FIG. 13 is a table of evaluation results, and shows dimensions of outer electrodes of various multilayer ceramic capacitors together with occurrence/absence of short-circuit failures and chip standing failures.

DESCRIPTION OF THE EMBODIMENTS

Embodiments of the present invention will be described in detail with reference to the accompanying drawings. The following embodiments do not limit the scope of the invention. Not all combinations of features described in the embodiments may be essential to the invention. The embodiments may be modified or changed depending on the specifications of the device to which the invention is applied and various conditions (usage conditions, usage environment, etc.). The technical scope of the present invention is defined by the claims and is not limited by the following individual embodiments. The drawings used in conjunction with the following description may differ in scale and shape from the actual structure in order to make each configuration easier to understand.

First Embodiment

Figure 1:
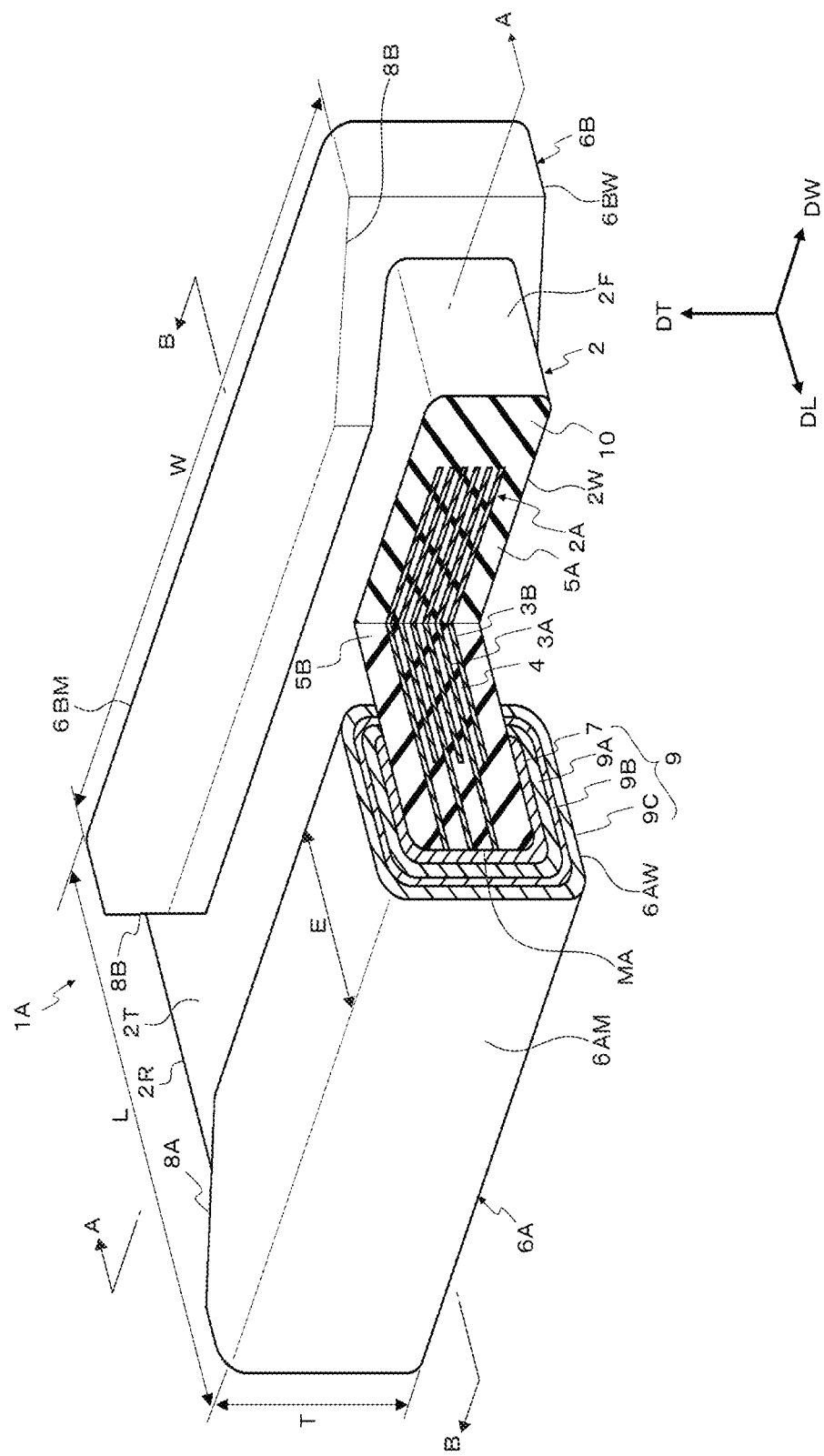
FIG. 1 is a perspective view of a multilayer ceramic capacitor according to a first embodiment of the present invention.
Figure 2A:
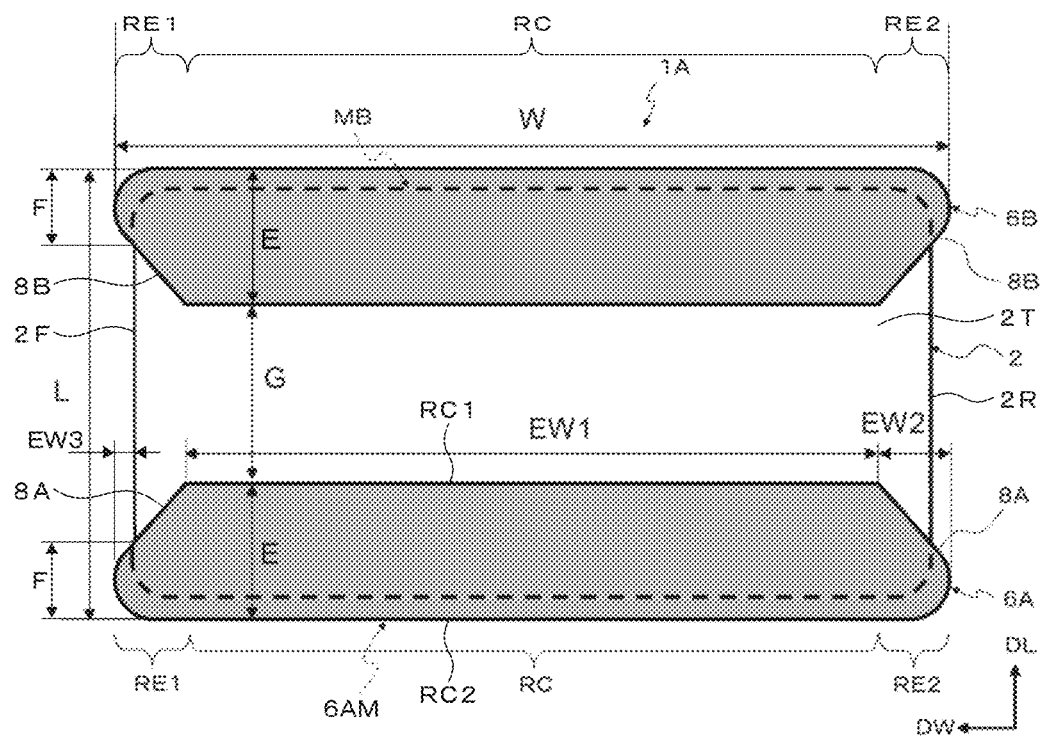
FIG. 2A is a plan view of the multilayer ceramic capacitor shown in FIG. 1.
Figure 2B:
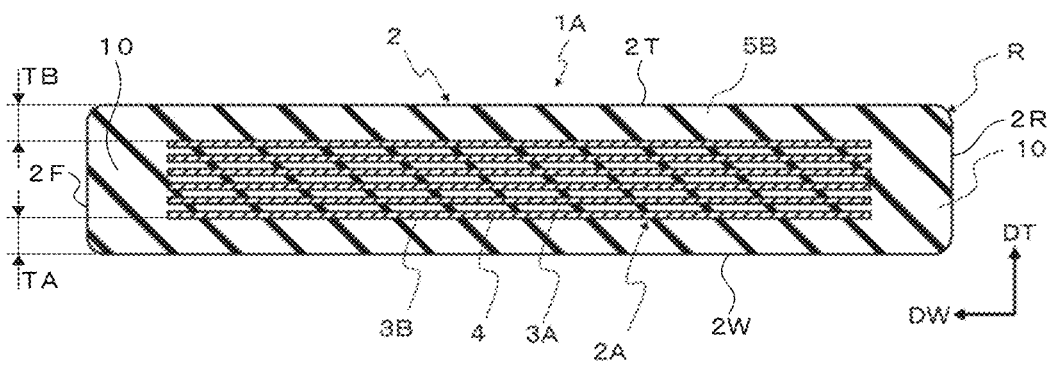
FIG. 2B is a cross-sectional view of the multilayer ceramic capacitor shown in FIG. 1 taken along the line A-A in FIG. 1.
Figure 2C:
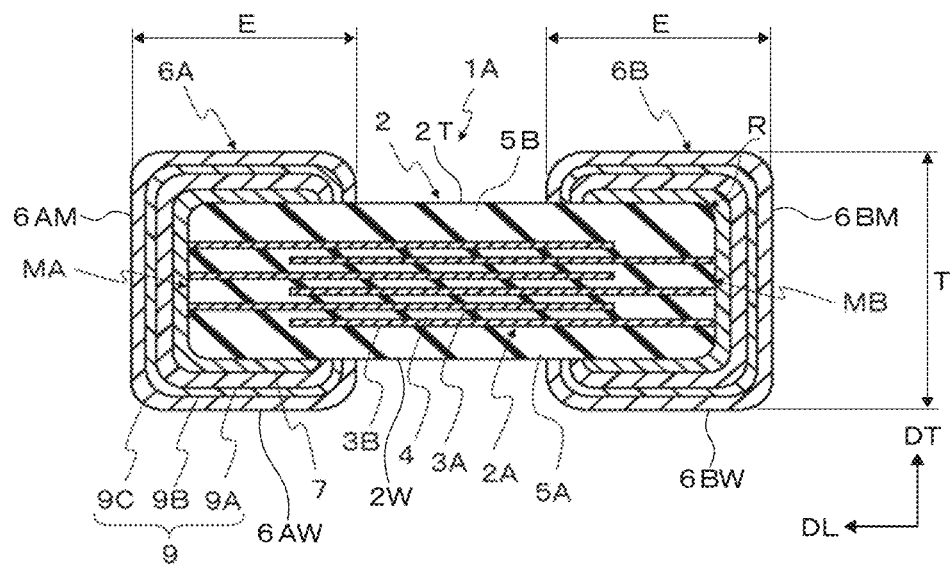
FIG. 2C is a cross-sectional view of the multilayer ceramic capacitor shown in FIG. 1 taken along the line B-B in FIG. 1.

FIG. 1 is a perspective view showing the configuration of a multilayer ceramic capacitor 1A according to a first embodiment of the present invention. The width direction of the capacitor 1A is designated by DW. The length direction of the capacitor 1A is designated by DL. The height direction of the capacitor 1A is designated by DT. The height direction DT may be referred to as a thickness direction. FIG. 2A is a plan view of the multilayer ceramic capacitor 1A shown in FIG. 1. FIG. 2B is a cross-sectional view of the multilayer ceramic capacitor 1A, cut in the width direction DW along the line A-A of FIG. 1. FIG. 2C is a cross-sectional view of the multilayer ceramic capacitor 1A, cut in the length direction DL along the line B-B of FIG. 1. T denotes the height (thickness) of the multilayer ceramic capacitor 1A. The multilayer ceramic capacitor 1A is an example of a ceramic electronic component.

As shown in FIG. 1 and FIG. 2A to FIG. 2C, the multilayer ceramic capacitor 1A includes an element body 2, a first outer electrode (external electrodes) 6A and a second outer electrode (external electrode) 6B. The element body 2 includes a laminate 2A, a lower cover layer 5A, and an upper cover layer 5B. The laminate 2A has inner electrode layers 3A and 3B and dielectric layers 4.

The lower cover layer 5A is provided below the laminate 2A, and the upper cover layer 5B is provided on top of the laminate 2A. The inner electrode layers 3A and 3B are alternately stacked via the dielectric layers 4. It should be noted that although FIG. 1, FIG. 2B and FIG. 2C show a configuration in which the inner electrode layers 3A and 3B are stacked for a total of only six layers, the number of stacked inner electrode layers 3A and 3B is not limited to six. The shape of the element body 2 may be a generally rectangular parallelepiped and the shape of the laminate 2A may also be a generally rectangular parallelepiped. Two opposite end faces of the element body 2 in the length direction DL are a left end face MA and a right end face MB of the element body 2. The element body 2 has a front lateral face 2F and a rear lateral face 2R in the width direction DW. The top face of the element body 2 is designated by 2T and the bottom face of the element body 2 is designated by 2W. The four faces of the element body 2 (i.e., the bottom face 2W, the top face 2T, the front face 2F, and the rear face 2R) are vertically connected to the end faces MA and MB of the element body 2. One end face of the outer electrode 6A is designated by 6AM and this end face corresponds to the end face MA of the element body 2. A bottom face of the outer electrode 6A is designated by 6AW. Another end face of the outer electrode 6B is designated by 6BM, and this end face corresponds to the end face MB of the element body 2. A bottom face of the outer electrode 6B is designated by 6BW. The element body 2 may be chamfered along ridge lines of the element body 2, and may have a curved surface R at the respective chamfered corner. The inner electrode layers 3A and 3B are not exposed at the lateral faces 2F and 2R.

The inner electrode layers 3A and 3B are stacked in the height direction DT via the dielectric layers 4. The height direction DT may be referred to as a stacking direction.

The direction perpendicular to the inner electrode layers 3A and 3B may be the stacking direction of the inner electrode layers 3A and 3B. The direction parallel to the inner electrode layers 3A and 3B may be a direction perpendicular to the stacking direction of the inner electrode layers 3A and 3B. The direction perpendicular to the inner electrode layers 3A and 3B may be a direction in which the inner electrode layers 3A and 3B faces over the dielectric layers 4. The direction parallel to the inner electrode layers 3A and 3B may be a direction perpendicular to the direction in which the inner electrode layers 3A and 3B face over the dielectric layers 4.

The multilayer ceramic capacitor 1A may be mounted on a mounting substrate 41 (FIG. 11) to remove noises applied to semiconductor chips (not shown) to be mounted on the mounting substrate 41.

In the longitudinal direction DL of the element body 2, the inner electrode layers 3A and 3B are alternately arranged at different positions in the laminate 2A. Specifically, when compared to the inner electrode layers 3B, the inner electrode layers 3A are arranged on the left end face MA of the element body 2, i.e., the inner electrode layers 3A extend in the length direction DL from the left end face MA of the element body toward the right end face MB. The inner electrode layers 3B are arranged on the right end face MB of the element body 2, i.e., the inner electrode layer 3B extend in the length direction DL from the right end face MB toward the left end face MA. The left end of each of the inner electrode layers 3A is exposed at the left end face MA of the element body 2 and is connected to the outer electrode 6A. The right end of each of the inner electrode layers 3B is exposed at the right end face MB of the element body 2 and is connected to the outer electrode 6B.

In the width direction DW of the element body 2, the ends of the inner electrode layers 3A and 3B are covered with the dielectric layers 4. In the width direction DW, the ends of the inner electrode layers 3A and 3B may be aligned with each other as shown in FIG. 2B. The element body 2 may have marginal portions 10 that sandwich the inner electrode layers 3A and 3B in the width direction DW.

The thickness of each of the inner electrode layers 3A and 3B and dielectric layers 4 in the height direction DT may be within the range from 0.05 μm to 5 μm, respectively. For example, the thickness of the inner electrode layer 3A is 0.3 μm, the thickness of the inner electrode layer 3B is 0.3 μm, and the thickness of the dielectric layer 4 is 0.3 μm. The material of the inner electrode layers 3A and 3B may be, for example, a metal such as Cu (copper), Fe (iron), Zn (zinc), Al (aluminum), Sn (tin), Ni (nickel), Ti (titanium), Ag (silver), Au (gold), Pt (platinum), Pd (palladium), Ta (tantalum) or W (tungsten), or may be an alloy containing these metals.

The main component of the material of the dielectric layer 4 may be, for example, a ceramic material that has a perovskite structure. The main component may be contained 50 at % or more. The ceramic material of the dielectric layer 4 may be, for example, barium titanate, strontium titanate, calcium titanate, magnesium titanate, strontium barium titanate, calcium barium titanate, calcium zirconate, barium zirconate, calcium zirconate titanate or titanium oxide.

The main component of the material of each of the lower cover layer 5A and the upper cover layer 5B may be, for example, a ceramic material. The main component of the ceramic material of the cover layer 5A, 5B may be the same as the main component of the ceramic material of the dielectric layer 4. The thickness TA of the lower cover layer 5A is preferably in the range from 5 μm to 30 μm, and the thickness TB of the upper cover layer 5B is preferably in the range from 5 μm to 30 μm.

The outer electrodes 6A and 6B are formed over the opposite end faces MA and MB of the element body 2 such that the left outer electrode 6A is separated from the right outer electrode 6B in the length direction DL. The left outer electrode 6A is formed on the left end face MA of the element body 2 and extends therefrom onto four neighboring faces (i.e., the top face 2T, the front face 2F, the bottom face 2W and the rear face 2R) of the element body 2. The right outer electrode 6B is formed on the right end face MB of the element body 2 and extends therefrom onto the four neighboring faces (i.e., the top face 2T, the front face 2F, the bottom face 2W and the rear face 2R) of the element body 2. The top face 2T, the front face 2F, the bottom face 2W and the rear face 2R are perpendicular to the two end faces MA and MB.

When viewed from the above, as shown in FIG. 2A, the outer electrode 6A has a trapezoidal shape that includes two end portions (side portions) RE1 and RE2 and a middle portion RC between the end portions (side portions) RE1 and RE2. As illustrated in FIG. 2A, a portion of the outer electrode 6A that is on the top face 2T of the element body 2 extends parallel to the inner electrodes 3A. The middle portion RC has a rectangular shape. The size of the rectangular shape in the direction DL, which is perpendicular to the end face MA, is denoted by E. Each of the end portions RE1 and RE2 has a generally triangular shape and its maximum size from the end face 6AM in the direction DL is the size E. In other words, most of the end portion RE1, RE2 is smaller than the size E in the direction DL. The outer electrode 6B is similar to the outer electrode 6A. Specifically, the outer electrode 6B has a trapezoidal shape that includes two end portions RE1 and RE2 and a middle portion (main area) RC between the end portions RE1 and RE2. A portion of the outer electrode 6B that is on the top face 2T of the element body 2 extends parallel to the inner electrodes 3B. The middle portion RC of the outer electrode 6B has a rectangular shape. The size of the rectangular shape in the direction DL, which is perpendicular to the end face MB, is denoted by E. Each of the end portions RE1 and RE2 of the outer electrode 6B has a generally triangular shape and its maximum size from the end face 6BM in the direction DL is the size E. In other words, most of the end portion RE1, RE2 of the outer electrode 6B is smaller than the size E in the direction DL. When viewed from the bottom, the outer electrodes 6A and 6B may also have the same shapes as those shown in FIG. 2A. Alternatively, the shapes shown in FIG. 2A may be employed in the portions of the outer electrodes 6A and 6B that are on the bottom face 2W only (i.e., the shapes shown in FIG. 2 are not formed in the portions of the outer electrodes 6A and 6B that are on the top face 2T of the element body 2). The size E may be referred to as a length of the outer electrode 6A, 6B. As shown in FIG. 2C, in this embodiment, the length E of the outer electrode 6A, 6B on the upper face 2T of the element body 2 is set to be equal to the length E of the outer electrode 6A, 6B on the lower face 2T.

As shown in FIG. 2A, the outer electrode 6A covers a certain area of the front face 2F of the element body 2 and a certain area of the rear face 2R of the element body 2. The areas of the front face 2F and the rear face 2R covered with the outer electrode 6A is denoted by F. In the drawing, the size F represents the size from the end face 6AM in the direction DL. Similarly, the outer electrode 6B covers a certain area of the front face 2F of the element body 2 and a certain area of the rear face 2R of the element body 2. The areas of the front face 2F and the rear face 2R covered with the outer electrode 6B is also denoted by F. The size F represents the size from the end face 6BM in the direction DL. The size F is smaller than the size E.

As mentioned earlier and shown in FIG. 2, each of the end portions RE1 and RE2 of the outer electrode 6A has a generally triangular shape, i.e., it has an inclined portion 8A. Similarly, each of the end portions RE1 and RE2 of the outer electrode 6B has an inclined portion 8B. The outline shape of each of the inclined portions 8A and 8B may be linear, curved, or combinations thereof. The outline shape of each of the inclined portions 8A may have a tapered shape or an arcuate shape, extending outward from the middle portion RC. Similarly, the outline shape of each of the inclined portions 8B may have a tapered shape or an arcuate shape, extending outward from the middle portion RC.

In FIG. 1, L denotes the external dimension of the multilayer ceramic capacitor 1A in the direction DL (i.e., the direction perpendicular to the end face MA of the element body 2), W denotes the external dimension of the multilayer ceramic capacitor 1A in the direction DW (i.e., the direction in parallel to the end face MA of the element body 2 and to the inner electrodes 3A, or the direction perpendicular to the direction perpendicular to the end face MA of the element body 2 and parallel to the inner electrodes 3A), and T denotes the external dimension of the multilayer ceramic capacitor 1A in the direction DT (i.e., the direction perpendicular to the direction perpendicular to the end face MA of the element body 2 and perpendicular to the inner electrodes 3A). In FIG. 2A, EW1 denotes the dimension of the middle portion RC of the external electrode 6A in the direction perpendicular to the direction perpendicular to the end face MA of the element body 2 and parallel to the inner electrodes 3A (in the width direction DW of the element body 2), EW2 denotes the dimension of each of the end portions RE1 and RE2 of the outer electrode 6A in the width direction DW of the element body 2, EW3 denotes the distance from the front face 2F (or the rear face 2R) of the element body 2 to the tip of the outer electrode 6A in the width direction DW, G denotes the distance between the middle portion RC of the outer electrode 6A and the middle portion RC of the outer electrode 6B in the direction perpendicular to the end face MA of the element body 2 (in the length direction DL of the element body 2), and E denotes the dimension of the middle portion RC of the outer electrode 6A in the direction perpendicular to of the end face MA of the element body 2. The multilayer ceramic capacitor 1A satisfies the following conditions: $L<W$, $L\leq0.4$ mm, $W\leq0.8$ mm, $T\leq100$ μm, $EW2\geq0.05$ mm, $G/EW1\geq0.22$, and $E/T\geq1.25$.

The conditions of $EW2\geq0.05$ mm, $G/EW1\geq0.22$, and $E/T\geq1.25$ may be satisfied by the top face 2T and bottom face 2W of the element body 2, or may be satisfied by only one of the top and bottom faces of the element body 2.

Each of the outer electrodes 6A and 6B includes a base layer (underlayer) 7 formed on the element body 2, and a plating layer 9 formed on the base layer 7. The left base layer 7 is formed on the left end face MA of the element body 2 and the right base layer 7 is formed on the right end face MB of the element body 2. Thus, the two base layers 7 are spaced from each other in the longitudinal direction DL of the element body 2. The left base layer 7 is formed on the left end face MA and extends therefrom onto neighboring areas of the four perpendicular faces (i.e., the front face 2F, the top face 2T, the rear face 2R and the bottom face 2W) of the element body 2. The right base layer 7 is formed on the right end face MB and extends therefrom onto neighboring areas of the front face 2F, the top face 2T, the rear face 2R and the bottom face 2W of the element body 2.

The main component of the metal used as the conductive material of the base layer 7 may contain at least one of, for example, Cu, Fe, Zn, Al, Ni, Pt, Pd, Ag, Au and Sn or may contain an alloy that includes at least one of these metals. The base layer 7 may be a sputtered film (layer) or a sintered film (layer), which is obtained by sintering a coating film (layer) on the element body. Alternatively, the base layer 7 may be a composite film (layer) of a sputtered film and a sintered film.

The base layer 7 may include a co-material which is mixed with the metal(s) of the base layer. The co-material may be present in the form of a plurality of islands in the base layer 7. If the co-material is present in the base layer 7 in the form of the islands, the co-material can reduce the difference in the thermal expansion coefficient between the element body 2 and the base layer 7, and can alleviate the stress on the base layer 7. The co-material is, for example, the ceramic component, which is the main component of the dielectric layer 4. The base layer 7 may contain a glass component. If the glass component is mixed in the base layer 7, the glass component can densify the base layer 7. This glass component is, for example, an oxide of Ba (barium), Sr (strontium), Ca (calcium), Zn, Al, Si (silicon) or B (boron).

The base layer 7 may contain a metal component that is included in the element body 2. This metal component is, for example, Mg, and a trace amount of Ni, Cr, Sr, Al, Na and/or Fe may be included in this metal component. The base layer 7 may include, for example, a compound containing Mg, Ni and O. Mg of this compound is the metal component included in the element body 2. Ni of this compound is the conductive material of the base layer 7.

If the base layer 7 is composed of the sintered body of the coating film containing a dielectric material, it is possible to ensure adhesion between the element body 2 and the base layer 7, and to make the base layer 7 thick. This ensures the strength of the outer electrode 6A, 6B, and ensures the conductivity to the inner electrode layers 3A, 3B. If the base layer 7 is the sintered body of the coating film containing the dielectric material, the coating film for the base layer 7 for the outer electrode 6A, which contains the dielectric material, can be formed on the left end face MA and on the four neighboring faces 2T, 2F, 2W and 2R of the element body 2 by one dipping. The coating film for the base layer 7 for the outer electrode 6B, which contains the dielectric material, can be formed on the right end face MB and on the four neighboring faces 2T, 2F, 2W and 2R of the element body 2 by one dipping. Thus, it is possible to suppress an increase in the number of manufacturing steps. It should be noted that if the base layer 7 is formed by dipping, the contour of the base layer 7 on the element body 2 becomes rectangular having no inclined portions 8A, 8B. Therefore, if the base layer 7 is formed by dipping, a step of making the inclined portions 8A, 8B on the outer electrode 6A, 6B is additionally required. This additional step uses an inhibitor that changes the contour of the base layer (will be described below).

The underlayer 7 may be a sputtered film or a deposited film such as a vapor-deposited film. The underlayer 7 may contain no ceramic component. If sputtering or vapor deposition is carried out with a metal mask that has openings corresponding to the inclined portions 8A and 8B, it is possible to form the inclined portions 8A and 8B on the outer electrodes 6A and 6B, respectively. If the underlayer 7 is a deposited film, it is possible to make the underlayer 7 thin. Thus, it is possible to reduce the height T of the multilayer ceramic capacitor 1A. When the underlayer 7 is made by sputtering or deposition such as vapor deposition, the sputtering or deposition may be carried out six times in order to form the underlayers 7 on the six faces of the element body 2 (i.e., the end faces MA, MB, the front face 2F, the rear face 2R, the lower face 2W and the upper face 2T). It should be noted that the underlayers 7 may be formed on only the four faces of the element body 2 (i.e., the end faces MA, MB, the lower face 2W and the upper face 2T). By omitting the formation of the underlayers 7 on the front face 2F and the rear face 2R of the element body 2, the sputtering or the deposition is only required to be carried out four times.

The underlayer 7 may be a composite film of a deposited film, such as a sputtered film or evaporation film, and a sintered body of a coating film (sintered coating film). Only the underlayers 7 on the lower face 2W of the element body 2 may be composite films, and the underlayers 7 on the remaining five faces (i.e., the end faces MA, MB, the front face 2F, the rear face 2R, and the upper face 2T) of the element body 2 may be the sintered coating films. If the underlayers 7 are made only of a deposited film, such as a sputtered film or evaporation film, it is necessary to carry out (repeat) the deposition step for the sputtered film or the evaporation film six times. On the other hand, if the underlayers 7 on the lower face 2W of the element body 2 are the composite films and the underlayers 7 on the remaining five faces of the element body 2 are the sintered coating films, the deposition step for the sputtered film or evaporation film can be carried out once and then dipping is carried out twice to form the coating films. This reduces the number of manufacturing steps. It should be noted that the sputtered film or the evaporation film may extend over one or more neighboring faces of the element body 2 by adjusting the process and the source of the sputtering or evaporation. By allowing the sputtered film or the evaporation film to extend over the neighboring face(s) of the element body 2, the single and continuous sputtered film or the single evaporation film may be formed on the lower face 2W and adjacent areas of the two end faces MA and MB at the same time by the single process of depositing the sputtered film or evaporation film. This can reduce the number of manufacturing steps.

When the underlayers 7 are formed by sintering the coating films, which are applied on the element body 2 by the dipping process, the underlayers 7 may be formed not only on the end faces MA, MB, the lower face 2W, and the upper face 2T of the element body 2, but also on the front face 2F and the rear face 2R of the element body 2. In this embodiment, an inhibitor (described below) that changes the contour of the base layer is used during the dipping process such that the outer electrode 6A located on the front face 2F and the rear face 2R of the element body 2 is retracted toward the end face MA as compared with the outer electrode 6A located on the upper face 2T and the lower face 2W of the element body 2 (F is smaller than E) and such that the outer electrode 6B located on the front face 2F and the rear face 2R of the element body 2 is retracted toward the end face MB as compared with the outer electrode 6B located on the upper face 2T and the lower face 2W of the element body 2. Therefore, even if a rotational deviation (rotational misalignment) of the multilayer ceramic capacitor 1A from a substrate 11 (FIG. 3A) occurs as shown in FIG. 4B during mounting of the multilayer ceramic capacitor 1A on the substrate 11 with solder and the solder moves up to each of the outer electrodes 6A and 6B on the front face 2F and the rear face 2R of the element body 2, it is possible to avoid short-circuiting between land electrodes 12A and 12B (FIG. 4B).

The plating layer 9 is formed for each of the outer electrodes 6A and 6B such that the plating layer 9 covers the underlayer 7. The left plating layer 9 is conductive with the inner electrode layers 3A through the left underlayer 7, and the right plating layer 9 is conductive with the inner electrode layers 3B through the right underlayer 7. The plating layers 9 are electrically connected to terminals 12A and 12B (FIG. 3A) on the substrate 11 through the solder 13A and 13B (FIG. 3A), respectively.

The material of the plating layer 9 may be a metal such as Cu, Fe, Zn, Al, Ni, Pt, Pd, Ag, Au or Sn, or an alloy made from two or more of these metals. The plating layer 9 may have a single-layer structure that includes a single metal component or a multi-layer structure that includes a plurality of plating layers of different metal components. For example, the plating layer 9 has a three-layer structure consisting of a Cu plating layer 9A formed on the base layer 7, an Ni plating layer 9B formed on the Cu plating layer 9A, and a Sn plating layer 9C formed on the Ni plating layer 9B. The Cu plating layer 9A can enhance the adhesiveness of the plating layer 9 to the base layer 7. The Ni plating layer 9B can increase the thermal resistance of the outer electrode 6A, 6B during soldering. The Sn plating layer 9C can improve the wettability of the solder to the plating layer 9.

As the multilayer ceramic capacitor 1A satisfies the condition of L<W, it is possible to widen and shorten the current path of the inner electrode layer 3A, 3B. This reduces the ESL (equivalent series resistance).

As the multilayer ceramic capacitor 1A satisfies the condition of L≤0.4 mm, W≤0.8 mm, and T≤100 μm, the multilayer ceramic capacitor 1A can have a compact size with a small height. This enables the LSC mounting and increases the mounting density on the substrate 11 (FIG. 3A).

Figure 3A:
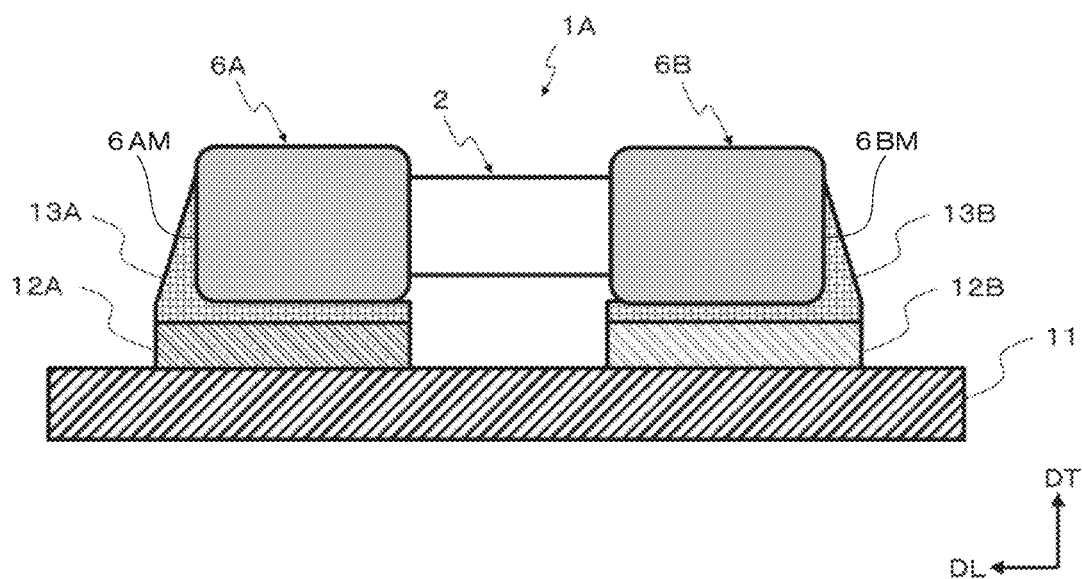
FIG. 3A is a side view showing a mounting example when the multilayer ceramic capacitor of FIG. 1A does not stand on a substrate upon mounting the multilayer ceramic capacitor onto the substrate.

As shown in FIG. 3A, when the multilayer ceramic capacitor 1A is mounted on the substrate 11, the left outer electrode 6A is connected to the left land electrode 12A by the solder layer 13A and the right outer electrode 6B is connected to the right land electrode 12B by the solder layer 13B. If the multilayer ceramic capacitor 1A satisfies the condition of EW2≥0.05 mm, the end portion RE1 or RE2 of the outer electrode 6A hardly contacts the land electrode 12B and the end portion RE1 or RE2 of the outer electrode 6B hardly contacts the land electrode 12A even when the rotational deviation occurs during mounting of the multilayer ceramic capacitor 1A onto the substrate 11. Thus, it is possible to avoid short-circuiting between the land electrodes 12A and 12B or between the outer electrodes 6A and 6B.

As long as the multilayer ceramic capacitor 1A satisfies the condition of G/EW1≥0.22, it is possible to increase the spacing G between the middle portion RC of the outer electrode 6A and the middle portion RC of the outer electrode 6B in accordance with an increase in the dimension EW1 of the middle portion RC of the outer electrode 6A. This is because the side RC1 of the middle portion RC of the outer electrode 6A will move toward the opposite side RC2 of the middle portion RC of the outer electrode 6A when the width EW1 of the middle portion RC becomes longer. Therefore, even when the rotational deviation occurs during mounting of the multilayer ceramic capacitor 1A onto the substrate 11, it is possible to prevent the outer electrode 6A from contacting the land electrode 12B and prevent the outer electrode 6B from contacting the land electrode 12A. Accordingly, it is possible to avoid the short-circuiting of the outer electrodes 6A and 6B.

As long as the multilayer ceramic capacitor 1A satisfies the condition of E/T≤1.25, it is possible to increase the size E of each of the outer electrodes 6A and 6B in the length direction DL in accordance with an increase in the dimension T of the outer electrode 6A in the height direction DT. Incidentally, if the dimension (height) T of the outer electrode 6A increases, the solder that moves up along the end face 6AM of the outer electrode 6A and the solder that moves up along the end face 6BM of the outer electrode 6B upon mounting the multilayer ceramic capacitor 1A onto the substrate 11 may cause the multilayer ceramic capacitor 1A to stand up on the substrate 11. On the other hand, if the dimension E of each of the outer electrodes 6A and 6B in the length direction DL is increased, the solder that adheres to the bottom face 6AW of the outer electrode 6A and the solder that adheres to the bottom face 6BW of the outer electrode 6B upon mounting the multilayer ceramic capacitor 1A onto the substrate 11 may enhance a force to keep the multilayer ceramic capacitor 1A horizontally. Therefore, it is possible to prevent the multilayer ceramic capacitor 1A from standing on the substrate 11 upon mounting the multilayer ceramic capacitor 1A onto the substrate 11 while reducing the dimension E of each of the outer electrodes 6A and 6B in accordance with the height reduction of the multilayer ceramic capacitor 1A.

The multilayer ceramic capacitor 1A preferably satisfies the condition of EW2/EW1≤0.34 in addition to the above-mentioned conditions. This suppresses the reduction in the size of the bottom face 6AW of the outer electrode 6A and the reduction in the size of the bottom face 6BW of the outer electrode 6B. Thus, it is possible to reduce or eliminate the mounting failure of the multilayer ceramic capacitor 1A on the substrate 11.

It is also preferable that the multilayer ceramic capacitor 1A satisfies the condition of G/EW1≤0.6 in addition to the above-mentioned conditions. Since G=L−E×2, G/EW1=(L−E×2)/EW1. Thus, E≤0.05 is achieved. This suppresses or avoids the occurrence of mounting failure of the multilayer ceramic capacitor 1A on the substrate 11.

The multilayer ceramic capacitor 1A preferably satisfies the condition of E/T≤2.0 in addition to the above-mentioned conditions. This suppresses an increase in the stress on each of the outer electrodes 6A, 6B, and reduces or avoids deterioration in reliability of the multilayer ceramic capacitor 1A.

Figure 3B:
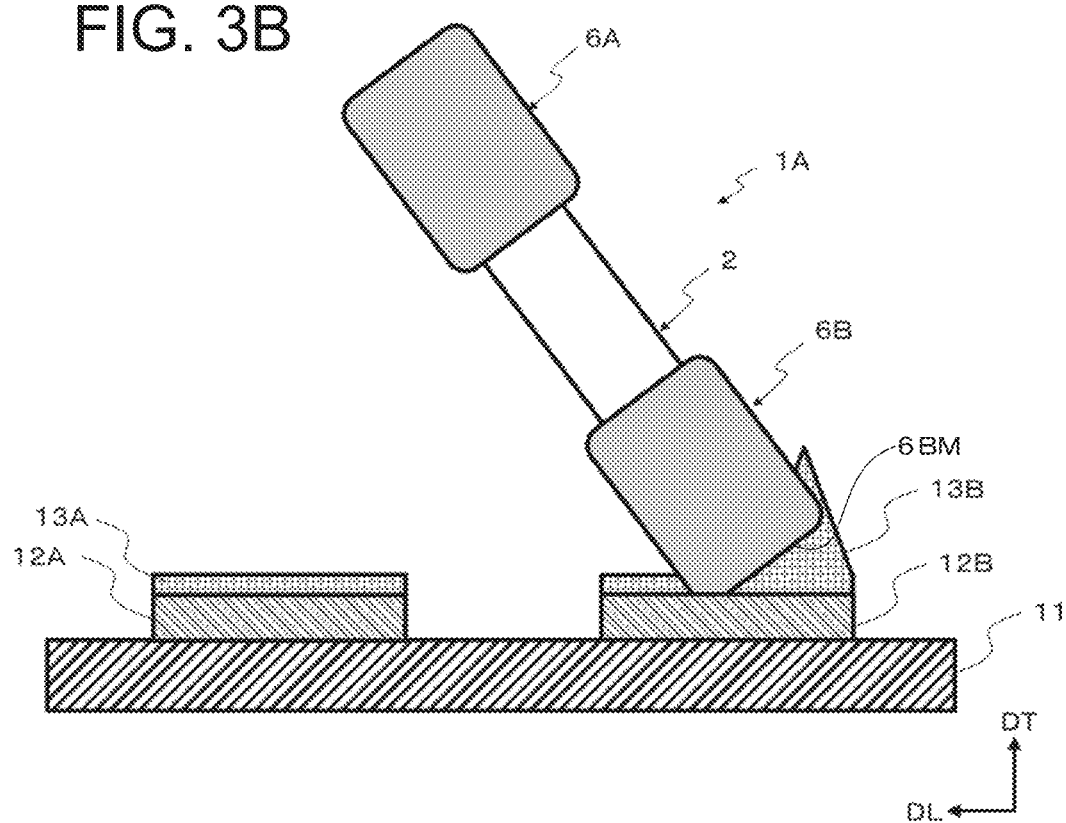
FIG. 3B is a side view showing an undesired mounting example when the multilayer ceramic capacitor of FIG. 1A stands on the substrate upon mounting the multilayer ceramic capacitor onto the substrate.

FIG. 3A is a side view showing a mounting example when there is no standing of the multilayer ceramic capacitor 1A on the substrate 11. FIG. 3B is a side view showing a mounting example when the multilayer ceramic capacitor 1A stands on the substrate 11.

As shown in FIG. 3A, the land electrodes 12A and 12B are formed on the mounting board 11. The multilayer ceramic capacitor 1A is connected to the land electrodes 12A and 12B via the solder layers 13A and 13B, respectively. The solder layer 13A adheres to the plating layer 9 of the outer electrode 6A, and the solder layer 13B adheres to the plating layer 9 of the outer electrode 6B. As the multilayer ceramic capacitor 1A does not stand on the mounting board 11, the solder layer 13A moves up along the end face 6AM of the outer electrode 6A in the same manner as the solder layer 13B moves up along the end face 6BM of the outer electrode 6B.

FIG. 3B shows an undesired example. When the multilayer ceramic capacitor 1A stands on the board 11 as shown in FIG. 3B, the solder layer 13A moves up along the end face 6AM of the outer electrode 6A in a different manner from the solder layer 13B moving up along the end face 6BM of the outer electrode 6B. For example, the solder layer 13B moves up along the end face 6BM of the outer electrode 6B before the solder layer 13A moves up along the end face 6AM of the outer electrode 6A. If this occurs, the solder layer 13B on the end face 6BM of the outer electrode 6B pulls the multilayer ceramic capacitor 1A and causes the multilayer ceramic capacitor 1A to stand on the board 11.

Figure 4A:
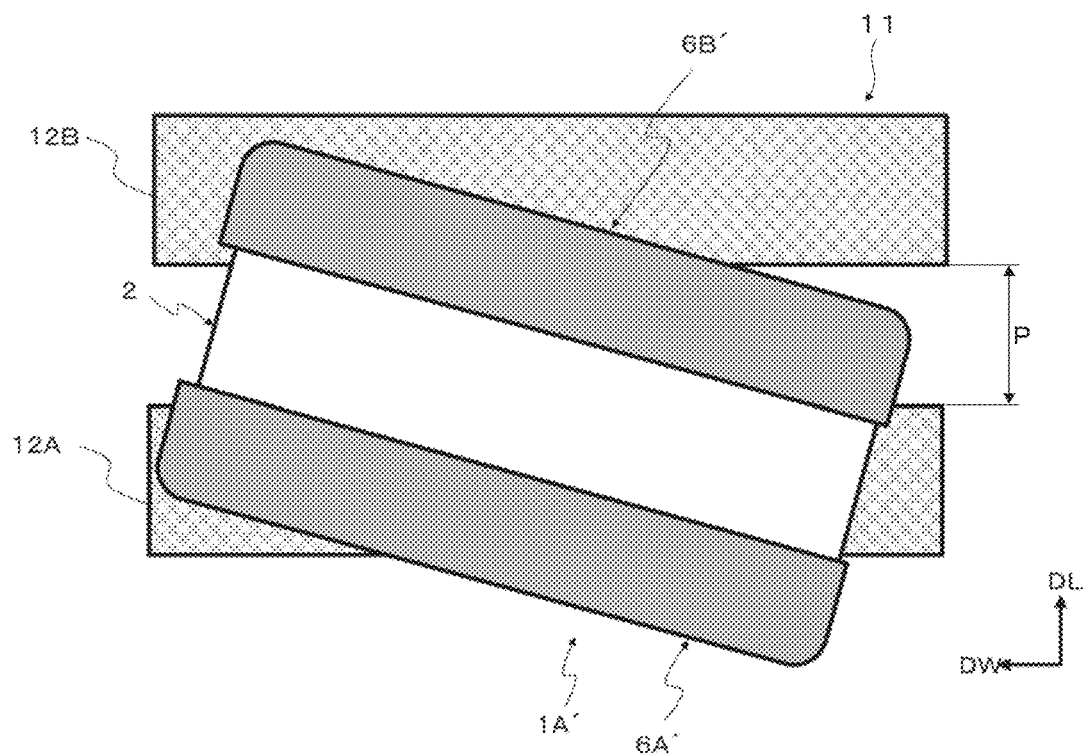
FIG. 4A is a plan view showing a mounting example when there is a rotational deviation between a multilayer ceramic capacitor and a mounting substrate and the multilayer ceramic capacitor has no inclined portions at end areas of outer electrodes.
Figure 4B:
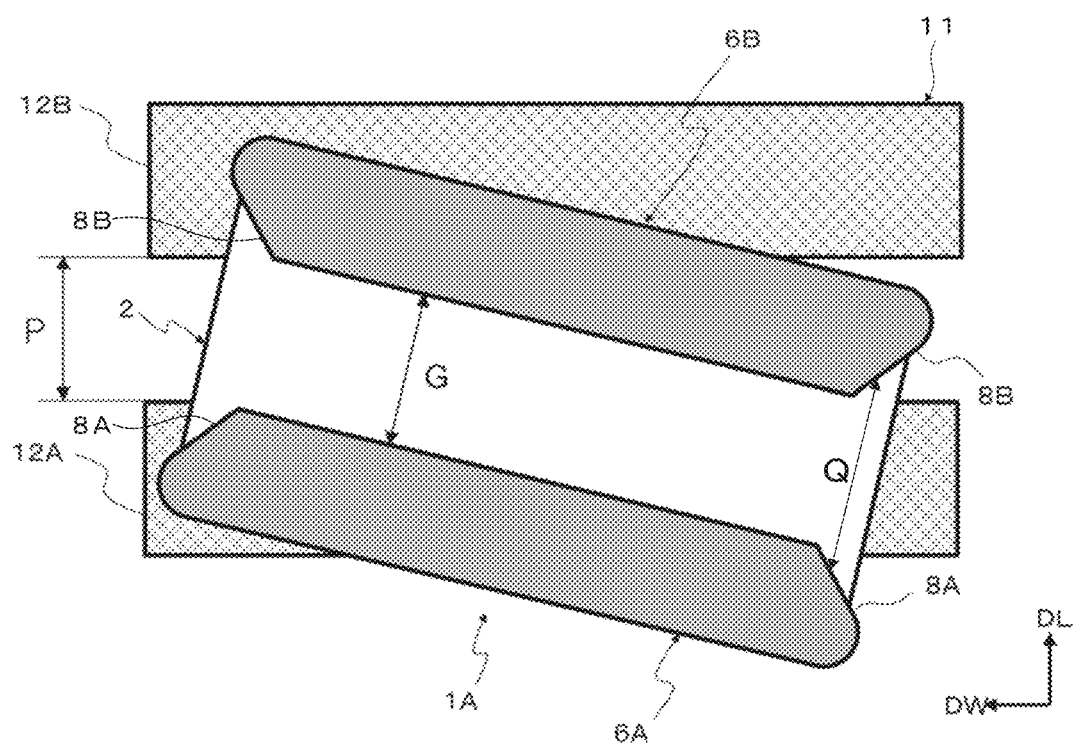
FIG. 4B is a plan view showing a mounting example when there is a rotational deviation between the multilayer ceramic capacitor of FIG. 1A and the mounting substrate.

FIG. 4A is a plan view showing a mounting example when there is a rotational deviation of a multilayer ceramic capacitor 1A' from the land electrodes 12A and 12B on the substrate 11. The land electrode 12A is spaced from the land electrode 12B on the substrate 11, and a gap between the land electrodes 12A and 12B is denoted by P. The multilayer ceramic capacitor 1A' does not have inclined portions at the end areas of each of the outer electrodes 6A' and 6B'. FIG. 4B is a plan view showing a mounting example when there is a rotational deviation of the multilayer ceramic capacitor 1A from the land electrodes 12A and 12B on the substrate 11. The multilayer ceramic capacitor 1A has the inclined portions 8A at the end areas of the outer electrode 6A and the inclined portions 8B at the end areas of the outer electrode 6B. In FIG. 4A and FIG. 4B, the same substrate 11 is used, and the same land electrodes 12A and 12B are used. In FIG. 4A, it is assumed that the configuration of the outer electrode 6A' on the top face of the capacitor 1A' is the same as the configuration of the outer electrode 6A' on the bottom face of the capacitor 1A' and that the configuration of the outer electrode 6B' on the top face of the capacitor 1A' is the same as the configuration of the outer electrode 6B' on the bottom face of the capacitor 1A'. In FIG. 4B, the configuration of the outer electrode 6A on the top face of the capacitor 1A is the same as the configuration of the outer electrode 6A on the bottom face of the capacitor 1A, and the configuration of the outer electrode 6B on the top face of the capacitor 1A is the same as the configuration of the outer electrode 6B on the bottom face of the capacitor 1A.

In FIG. 4A, the multilayer ceramic capacitor 1A' includes the outer electrodes 6A' and 6B' instead of the outer electrodes 6A and 6B of the multilayer ceramic capacitor 1A shown in FIG. 2A. The outer electrodes 6A' and 6B' do not have the inclined portions. As shown in FIG. 4A, each of the outer electrodes 6A' and 6B' is a simple rectangle when viewed from the top. Other portions of the outer electrodes 6A' and 6B' are configured similarly to the outer electrodes 6A and 6B. If rotational misalignment occurs between the capacitor 1A' and the substrate 11 during mounting of the multilayer ceramic capacitor 1A' onto the substrate 11 and the outer electrode 6B' bridges the gap P (i.e., the outer electrode 6B' connects the land electrode 12A to the land electrode 12B), the outer electrodes 6A' and 6B' are short-circuited.

In FIG. 4B, on the other hand, the outer electrode 6A of the multilayer ceramic capacitor 1A has the inclined portions 8A and 8A, and the outer electrode 6B has the inclined portions 8B and 8B. Therefore, even if the same rotational deviation as the multilayer ceramic capacitor 1A' occurs during mounting of the multilayer ceramic capacitor 1A on the substrate 11, the outer electrode 6B does not bridge the gap P and does not contact the land electrode 12A (i.e., the outer electrode 6B does not connect the land electrode 12B to the land electrode 12A). The inclined portion 8B of the outer electrode 6B avoids the contact with the land electrode 12A. Therefore, the outer electrodes 6A and 6B are not short-circuited.

The gap P between the land electrodes 12A and 12B is preferably equal to the spacing G between the middle portion RC of the outer electrode 6A and the middle portion RC of the outer electrode 6B. Thus, the gap P between the land electrode 12A and 12B can be narrower than the distance Q between the end portion RE1 of the outer electrode 6A and the end portion RE1 of the outer electrode 6B and the distance Q between the end portion RE2 of the outer electrode 6A and the end portion RE2 of the outer electrode 6B while suppressing the reduction in the contact areas between the outer electrode 6A and the land electrode 12A and between the outer electrode 6B and the land electrode 12B. As a result, it is possible to avoid the short-circuiting between the outer electrodes 6A and 6B due to rotational deviation of the multilayer ceramic capacitor 1A from the land electrodes 12A and 12B.

Figures 5, 6A:
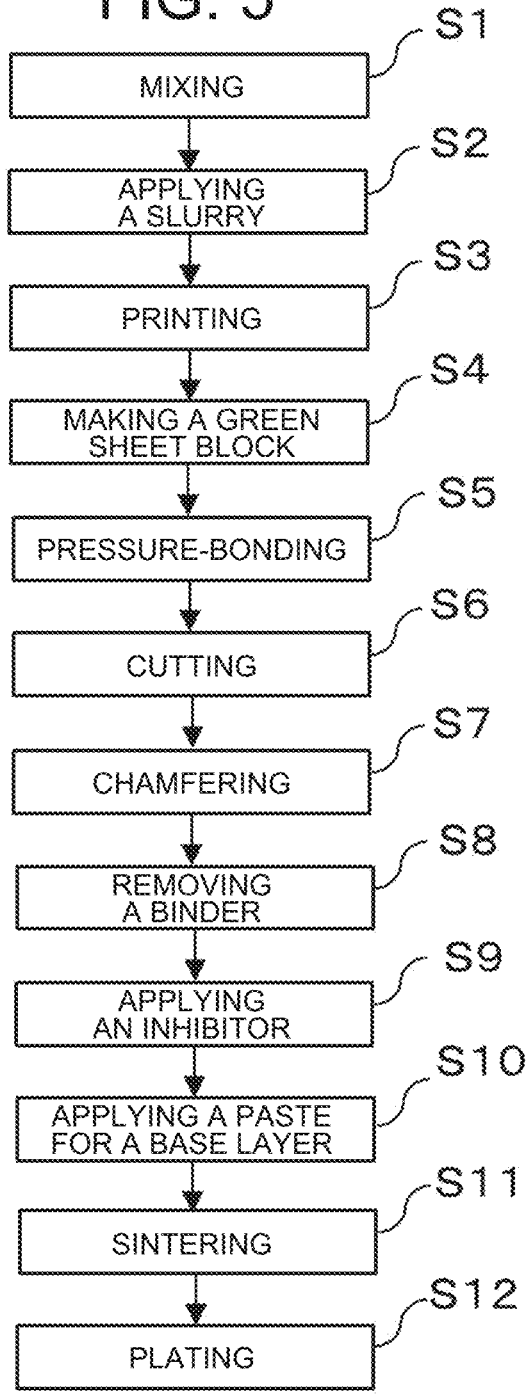
FIG. 5 is a flowchart showing an exemplary method of manufacturing the multilayer ceramic capacitor of FIG. 1.
FIGS. 6A-6I are cross-sectional views of the multilayer ceramic capacitor at various intermediate steps during an exemplary manufacturing method therefor, respectively.

FIG. 5 is a flowchart showing a method of manufacturing the multilayer ceramic capacitor 1A. FIG. 6A to FIG. 6I are a series of cross-sectional views showing the method of manufacturing the multilayer ceramic capacitor 1A. In this example, the three inner electrode layers 3A and the three inner electrode layers 3B are alternately stacked in the thickness direction DT of the capacitor 1A, with the dielectric layers 4 being interposed between the inner electrode layers 3A and 3B, but the numbers of the internal electrodes are not limited to three, needless to say, in actual applications. Also in this example, it is assumed that a paste for the base layer 7 is applied on the element body 2 by dipping. The paste then becomes the coating film on the element body 2. The base layer 7 is made by sintering the coating film.

In Step S1 of FIG. 5, an organic binder and an organic solvent as a dispersant and a forming aid are added to a dielectric material powder, and pulverized and mixed to produce a muddy slurry. The dielectric material powder includes, for example, a ceramic powder. The dielectric material powder may contain an additive or additives. The additive(s) may be, for example, an oxide of Mg (magnesium), Mn (manganese), V (vanadium), Cr (chromium), Y (yttrium), Sm (samarium), Eu (europium), Gd (cadmium), Tb (terbium), Dy (dysprosium), Ho (holmium), Er (erbium), Tm (thulium), Yb (ytterbium), Co (cobalt), Ni, Li (lithium), B, Na (sodium), K (potassium) or Si, or glass. The organic binder is, for example, polyvinyl butyral resin or polyvinyl acetal resin. The organic solvent is, for example, ethanol or toluene. Next, as indicated in Step S2 of FIG. 5 and shown in FIG. 6A, a green sheet 24 is prepared. Specifically, the slurry containing the ceramic powder is applied onto a carrier film in a sheet form and dried to manufacture the green sheet 24. The carrier film is, for example, a PET (polyethylene terephthalate) film. A doctor blade method, a die coater method or a gravure coater method may be used to apply the slurry onto the carrier film. Step S2 is repeated to prepare a plurality of green sheets 24.

Figure 6B:
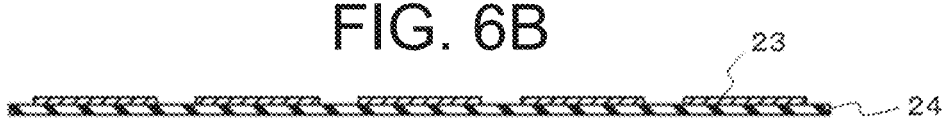

Next, as indicated in Step S3 of FIG. 5 and shown in FIG. 6B, a conductive paste, which will become the inner electrode, is applied in a predetermined pattern onto each of those green sheets 24, which will form the inner electrode layers 3A and 3B, among the green sheets prepared in Step S1 to form a plurality of inner electrode patterns 23 on that green sheet 24. In Step 3, it is possible to form a plurality of inner electrode patterns 23 on the single green sheet 24 such that the inner electrode patterns 23 are separated from each other in the longitudinal direction of the green sheet 24. The conductive paste for the inner electrode includes a powder of the metal used as the material of the inner electrode layers 3A and 3B. For example, if the metal used as the material of the inner electrode layers 3A and 3B is Ni, the conductive paste for the inner electrodes contains a Ni powder. Further, the conductive paste for the inner electrodes includes a binder, a solvent, and, if necessary, an auxiliary agent. The conductive paste for the inner electrodes may contain, as a co-material, a ceramic material which is the main component of the dielectric layers 4. The application of the conductive paste for the inner electrodes may be carried out by a screen printing method, an ink jet printing method or a gravure printing method. Thus, Step S3 may be referred to as a printing step. In this manner, a plurality of green sheets 24 that have the inner electrode patterns 23 thereon are prepared.

Figure 6C:
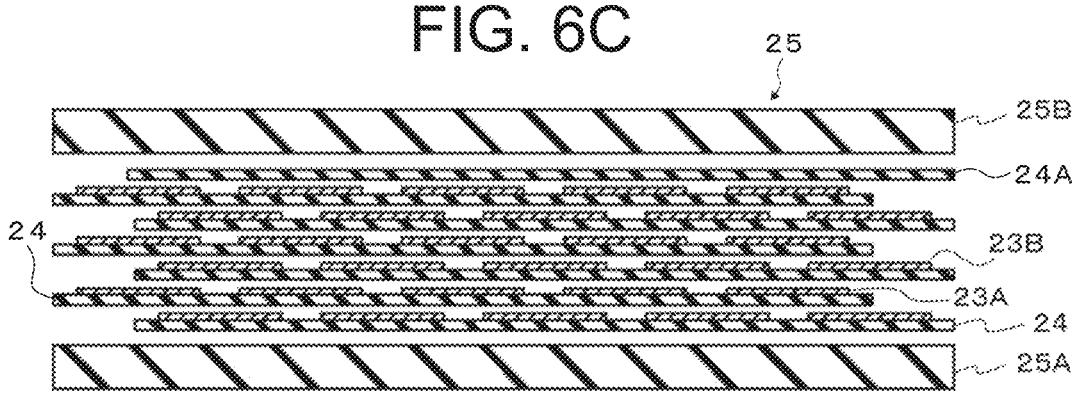

Next, as indicated in Step S4 of FIG. 5 and shown in FIG. 6C, the green sheets 24 on which the inner electrode patterns 23 are formed and the green sheets 24A, 25A and 25B on which the inner electrode patterns 23 are not formed are laminated in a predetermined order to create a block 25 of the green sheets 24. The green sheets 25A and 25B on which the inner electrode patterns 23 are not formed are used as outer layers (i.e., the bottom layer and the top layer). The thickness of the green sheet 25A, 25B is greater than the thickness of the green sheet 24 on which the inner electrode patterns 23 are formed. In Step S4, the green sheets 24 having the inner electrode patterns 23 thereon are divided into two groups, i.e., the green sheets 24 having the inner electrode patterns 23A thereon and the green sheets 24 having the inner electrode patterns 23B thereon. Then, the green sheets 24 having the inner electrode patterns 23A thereon and the green sheets 24 having the inner electrode patterns 23B thereon are stacked alternately in the laminating direction such that the inner electrode patterns 23A on the green sheet 24 and the inner electrode patterns 23B on the next or adjacent green sheet 24 are alternately shifted in the longitudinal direction of the green sheet 24. Further, three types of portions are defined in the green sheet block 25. Specifically, a portion where only the inner electrode patterns 23A are stacked in the stacking direction, a portion where the inner electrode patterns 23A and 23B are stacked alternately in the stacking direction, and a portion where only the inner electrode patterns 23B are stacked in the stacking direction are defined the green sheet block 25.

Figure 6D:
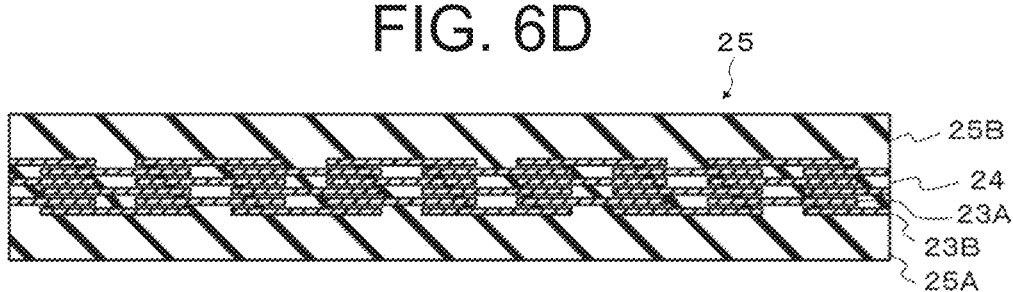

Next, as indicated in Step S5 of FIG. 5 and shown in FIG. 6D, the laminate block 25 obtained in the forming process of Step S4 of FIG. 3 is pressed such that the green sheets 24, 24A, 25A and 25B are pressure-bonded. Pressing the laminate block 25 may be carried out by, for example, sandwiching the laminate block 25 between resin films, and hydrostatically pressing the laminate block 25.

Figure 6E:
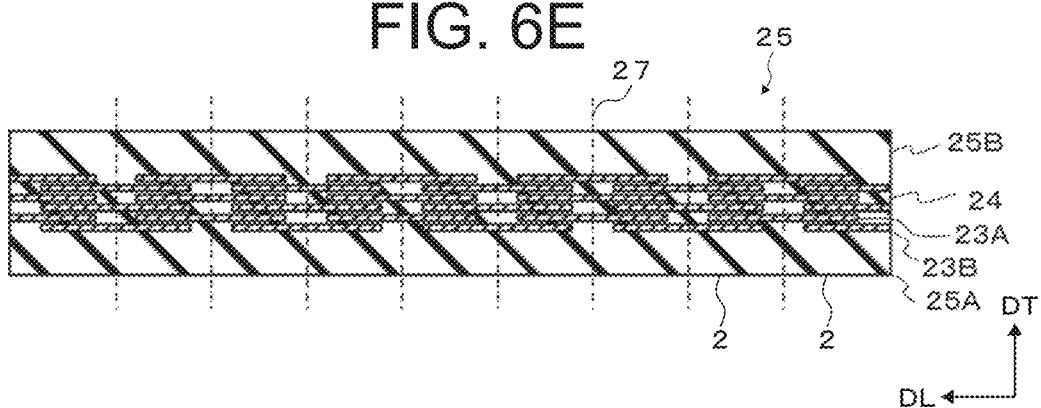

Next, as indicated in Step S6 of FIG. 5 and shown in FIG. 6E, the pressed laminate block 25 is cut such that the block 25 is separated to a plurality of element bodies 2, each of which has a rectangular parallelepiped shape. Each element body 2 has six faces. The cutting of the laminate block 25 is carried out at the portions where only the inner electrode patterns 23A are present in the stacking direction DT, and the portions where only the inner electrode patterns 23B are present in the stacking direction DT, as indicated by a plurality of vertical broken lines 27. The cutting of the laminate block 25 is carried out by, for example, blade dicing or a similar method. One of the resulting element bodies 2 is shown in FIG. 6F.

Figure 6F:
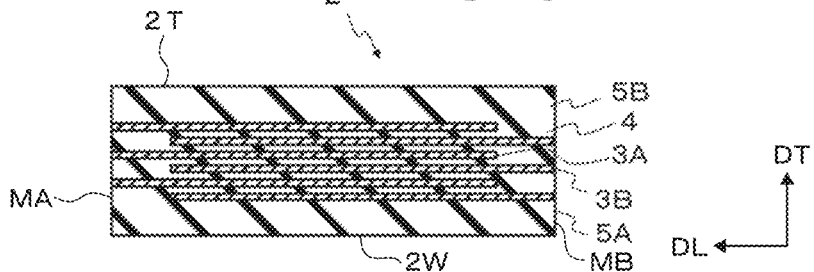

As shown in FIG. 6F, the inner electrode layers 3A and 3B are alternately laminated via the dielectric layers 4 in each of the individual element bodies 2, with the upper cover layer 5A becoming the top layer and the lower cover layer 5B becoming the bottom layer. The inner electrode layers 3A are exposed at the left end face MA of each element body 2, and the inner electrode layers 3B are exposed at the right end face MB of each element body 2. It should be noted that in FIG. 6F the element body 2 is shown enlarged in the length direction DL.

Figure 6G:
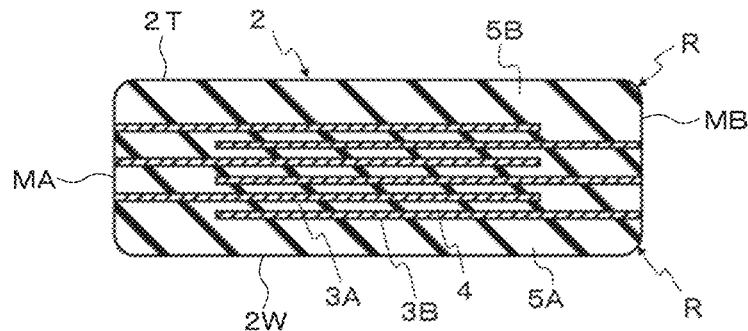

Next, as indicated in Step S7 of FIG. 5 and shown in FIG. 6G, chamfering is carried out to the element body 2 such that the element body 2 has curved surfaces R at the corners of the element body 2. For example, barrel polishing may be used to chamfer the corners (or the ridges) of the element body 2.

Next, as indicated in Step S8 of FIG. 5, the binder contained in each of the element bodies 2 obtained in Step S7 of FIG. 5 is removed. The removal of the binder is carried out by, for example, heating the element bodies 2 in an $N_2$ atmosphere at about 350 degrees C.

Next, as indicated in Step S9 of FIG. 5, an inhibitor for inhibiting the adhesion of the conductive paste for underlayer is applied onto predetermined areas of the element body 2. Specifically, the inhibitor is applied to the forming areas of the inclined portions 8A and 8B of FIG. 1. The inhibitor is, for example, silicone that is not wetted by the conductive paste for the underlayer. The application of the inhibitor on the element body 2 may be carried out by, for example, a screen printing method, an ink jet printing method, a gravure printing method or the like.

Next, as indicated in Step S10 of FIG. 5, a conductive paste for the base layer (underlayer) 7 is applied to the two end faces MA and MB of each element body 2, which has undergone the inhibitor application of Step S9, and to adjacent areas of the remaining four faces (top face 2T, the bottom face 2W, the front face 2F and the rear face 2R) of the element body 2 that are in contact with the respective end faces MA and MB. Then, the conductive paste is dried. A dipping method may be used to apply the conductive paste for the base layer 7. Because the inhibitor is already applied to the forming areas of the inclined portions 8A and 8B, the conductive paste for the base layer does not adhere to the forming areas of the inclined portions 8A and 8B. The conductive paste for the base layer 7 includes a powder or filler of the metal used as the conductive material of the base layer 7. For example, when the metal used as the conductive material of the base layer 7 is Ni, the conductive paste for the base layer includes a powder or filler of Ni. Further, the conductive paste for the base layer includes, as a co-material, a ceramic component, which is the main component of the dielectric layers 4, for example. Particles of oxide ceramics mainly composed of barium titanate (0.8 μm to 4 μm in D50 particle diameter), for example, are mixed in the conductive paste for the base layer, as the co-material. Further, the conductive paste for the base layer includes a binder and a solvent.

Figure 6H:
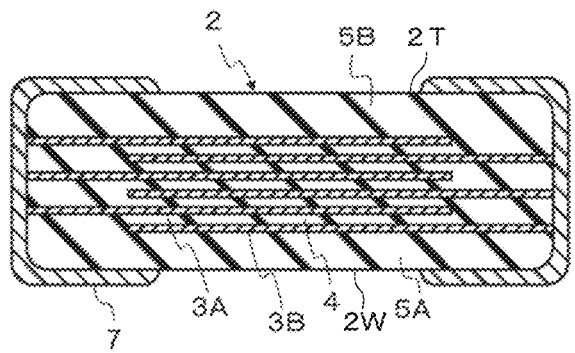
Figure 6I:
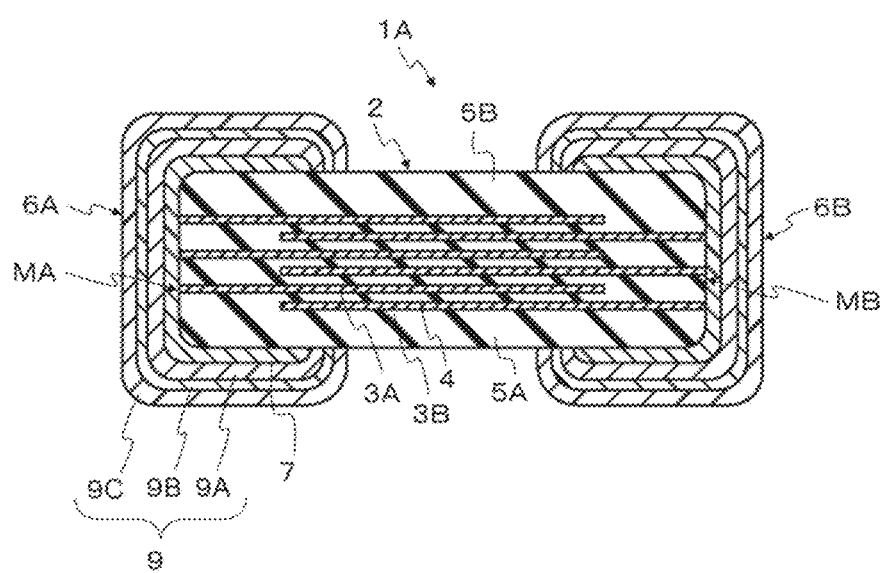

Next, as indicated in Step S11 of FIG. 5 and shown in FIG. 6H, the element bodies 2, on which the conductive paste for the base layer is applied in Step S10 of FIG. 5, undergo the sintering process such that the inner electrode layers 3A and 3B are integrated with the dielectric layers 4 in each element body 2 and the base layers 7 are formed and integrated with the element body 2. Because the conductive paste for the base layer is not applied in the forming areas of the inclined portions 8A and 8B, the base layers 7 are not formed in the forming areas of the inclined portions 8A and 8B. The sintering of the element bodies 2 and the conductive paste for the base layers is carried out in, for example, a sintering furnace in a temperature range from 1000 degrees C. to 1400 degrees C. for ten minutes to two hours. If a base metal such as Ni or Cu is used as the material of the inner electrode layers 3A and 3B, the sintering process may be carried out in the sintering furnace while the interior of the sintering furnace is kept to a reducing atmosphere in order to prevent the oxidation of the inner electrode layers 3A and 3B. When the base layers 7 are formed on the element bodies 2, an oxidation process may repeatedly be performed in a $N_2$ atmosphere at a temperature between 600 degrees C. and 1000 degrees C.

Subsequent to Step S11, a plating process is carried out. Specifically, as indicated in Step S12 of FIG. 5 and shown in FIG. 6I, a plating layer 9 is formed on each of the base layers 7. The plating layer 9 includes three sub-layers, i.e., a Cu plating layer 9A on the base layer 7, an Ni plating layer 9B on the Cu plating layer 9A, and a Sn plating layer 9C on the Ni plating layer 9B. In the plating process, the element body 2 on which the base layers 7 are formed is placed in a barrel together with the plating solution, and the electricity is supplied to the barrel while rotating the barrel, so as to form the plating layers 9 on the base layers 7.

Second Embodiment

Figure 7A:
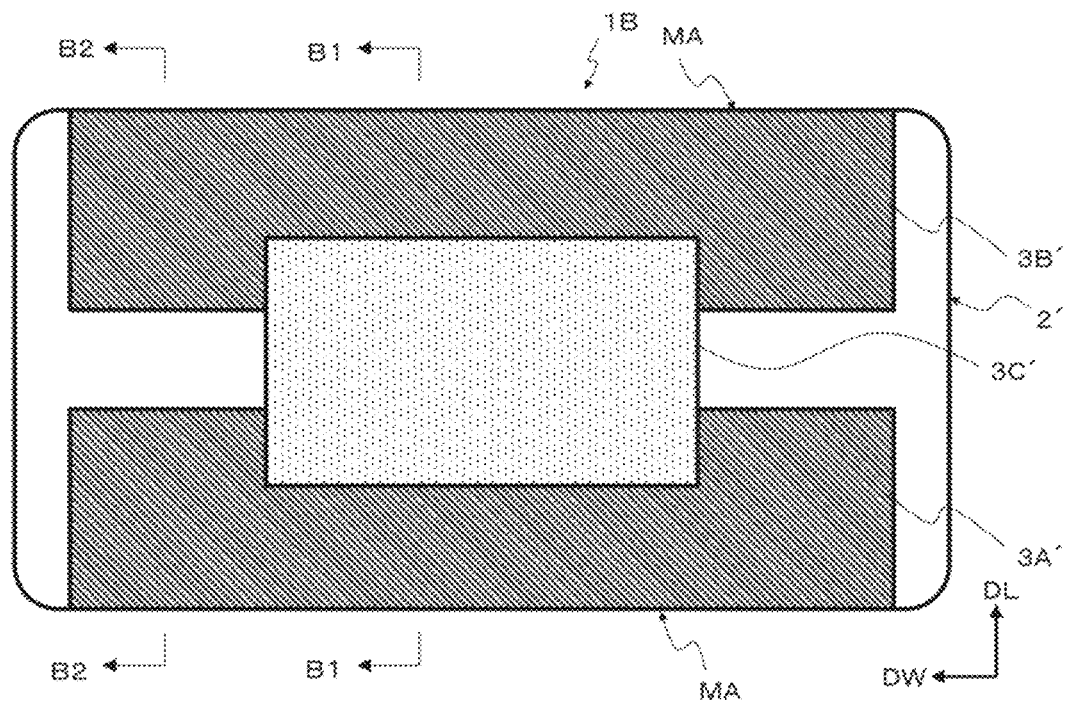
FIG. 7A is a plan view showing an internal configuration of an element body of a multilayer ceramic capacitor according to a second embodiment of the present invention.
Figure 7B:
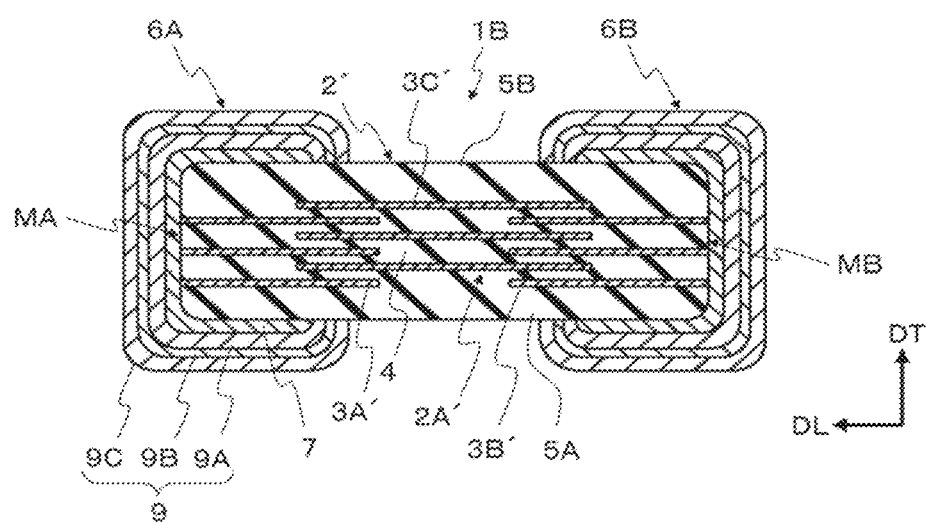
FIG. 7B is a cross-sectional view of the multilayer ceramic capacitor shown in FIG. 7A, taken along the line B1-B1 of FIG. 7A.
Figure 7C:
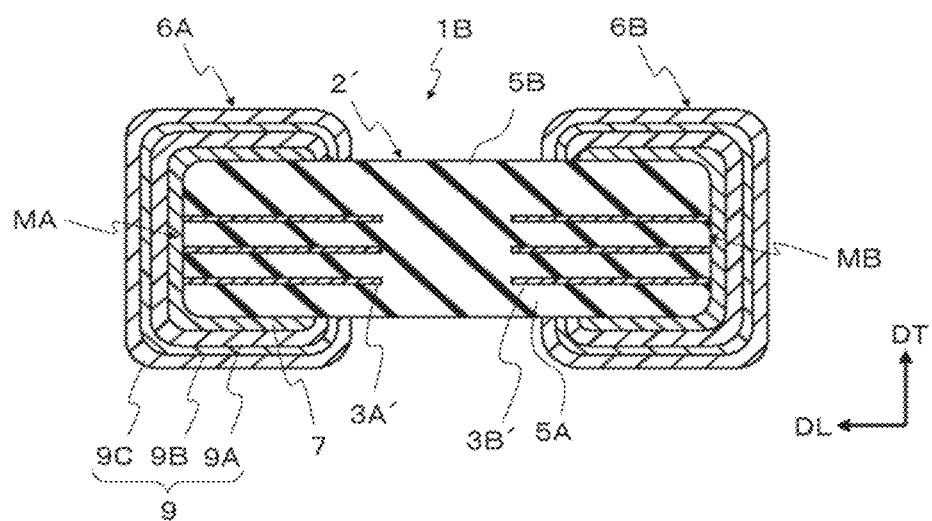
FIG. 7C is a cross-sectional view of the multilayer ceramic capacitor shown in FIG. 7A, taken along the line B2-B2 of FIG. 7A.

A second embodiment of the present invention will be described with reference to FIG. 7A to FIG. 7C. Similar reference numerals are used to designate similar or same elements in the first and second embodiments. FIG. 7A is a plan view showing an inner structure of an element body 2' of a multilayer ceramic capacitor 1B according to the second embodiment. The multilayer ceramic capacitor 1B includes the element body 2', outer electrodes 6A and 6B, inner electrode layers 3A' and 3B' and floating electrodes 3C'. The outer electrodes 6A and 6B are not illustrated in FIG. 7A. FIG. 7B is a cross-sectional view of the multilayer ceramic capacitor 1B taken along the line B1-B1. The line B1-B1 extends in the length direction DL and cuts the inner electrode layers 3A' and 3B' and the floating electrodes 3C'. FIG. 7C is a cross-sectional view of the multilayer ceramic capacitor 1B taken along the line B2-B2. The line B2-B2 does not extend through the floating electrodes 3C'.

As understood from comparison between the second embodiment (FIG. 7A to FIG. 7C) and the first embodiment (FIG. 1 and FIG. 2A to FIG. 2C), the multilayer ceramic capacitor 1B includes the element body 2' instead of the element body 2 of the multilayer ceramic capacitor 1A of FIG. 1. The element body 2' has a laminate 2A' instead of the laminate 2A of the multilayer ceramic capacitor 1A of FIG.

1. The laminate 2A' includes the inner electrode layers 3A' and 3B' and the floating electrodes 3C' instead of the inner electrode layers 3A and 3B of the multilayer ceramic capacitor 1A of FIG. 2A to FIG. 2C. Other portions of the multilayer ceramic capacitor 1B may be configured similarly to the multilayer ceramic capacitor 1A.

The inner electrode layers 3A' and 3B' are alternately arranged at different positions in the laminate 2A'. Specifically, when compared to the inner electrode layers 3B', the inner electrode layers 3A' are arranged on the left end face MA of the element body 2', i.e., the inner electrode layers 3A' extend in the length direction DL from the left end face MA of the element body 2' toward the right end face MB. The inner electrode layers 3B' are arranged on the right end face MB of the element body 2', i.e., the inner electrode layer 3B' extend in the length direction DL from the right end face MB toward the left end face MA. The left end of each of the inner electrode layers 3A' is exposed at the left end face MA of the element body 2' and is connected to the outer electrode 6A. The right end of each of the inner electrode layers 3B' is exposed at the right end face MB of the element body 2' and is connected to the outer electrode 6B.

The floating electrodes 3C' are arranged within the element body 2', i.e., the floating electrodes 3C' are not exposed at the left end face MA of the element body 2' and not exposed at the right end face MB. The floating electrodes 3C' face the respective inner electrode layers 3A' and 3B' when viewed in the height direction DT of the multilayer ceramic capacitor 1B. When the left half of the multilayer ceramic capacitor 1B is looked at in FIG. 7B, the inner electrode layers 3A' and the floating electrodes 3C' are alternately stacked. When the right half of the capacitor 1B is looked at, the inner electrode layers 3B' and the floating electrodes 3C' are alternately stacked.

In the multilayer ceramic capacitor 1B, it is possible to alter the capacitance of the multilayer ceramic capacitor 1B by changing the size of each of the floating electrodes 3C'. Thus, an adjustable range of the capacitance of the multilayer ceramic capacitor 1B is large. It is also possible to suppress variations in the capacitance of the multilayer ceramic capacitor 1B due to the positional deviation of the floating electrodes 3C' from the inner electrode layers 3A' and 3B'. Thus, it is possible to improve the stability at the time of manufacturing the multilayer ceramic capacitor 1B.

Third Embodiment

Figure 8:
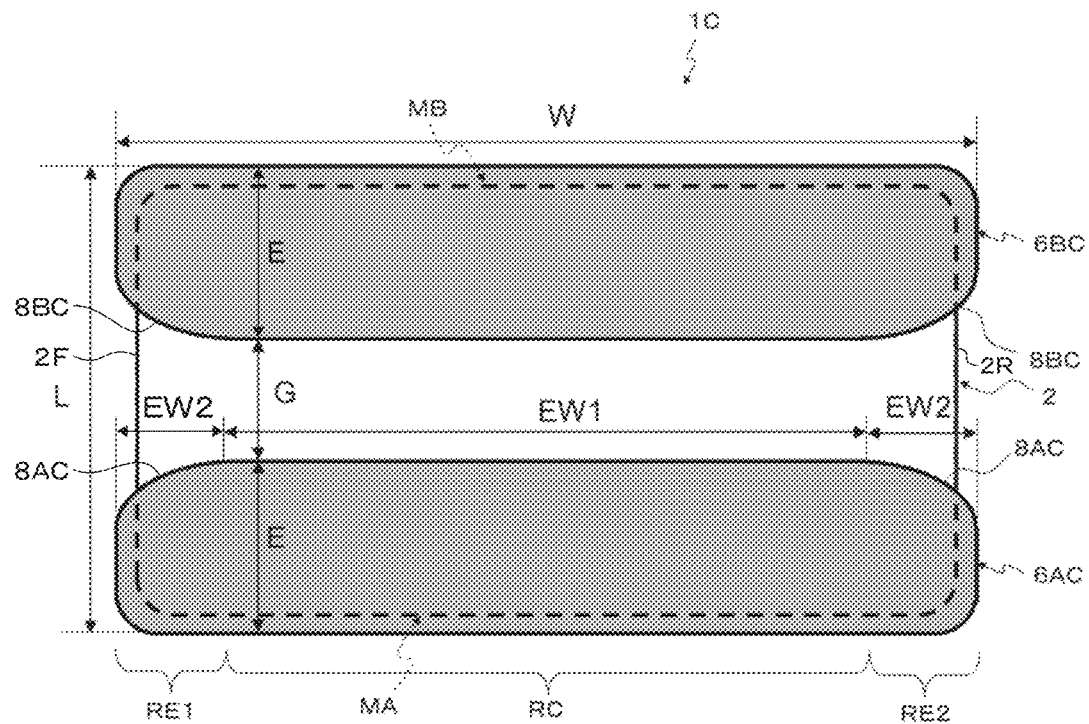
FIG. 8 is a plan view showing a configuration of a multilayer ceramic capacitor according to a third embodiment of the present invention.

A third embodiment of the present invention will be described with reference to FIG. 8. FIG. 8 is a plan view showing the configuration of a multilayer ceramic capacitor 1C according to the third embodiment. Similar reference numerals are used to designate similar or same elements in the first and third embodiments.

As shown in FIG. 8, the multilayer ceramic capacitor 1C includes outer electrodes 6AC and 6BC instead of the outer electrodes 6A and 6B of the multilayer ceramic capacitor 1A of FIG. 2A. The outer electrode 6AC includes inclined portions 8AC instead of the inclined portions 8A of the outer electrode 6A. The outer electrode 6BC includes inclined portions 8BC instead of the inclined portions 8B of the outer electrode 6B. Other portions of the multilayer ceramic capacitor 1C may be configured similarly to the multilayer ceramic capacitor 1A.

In the first embodiment, the outline shape of each of the inclined portions 8A of the outer electrode 6A is linear (i.e., the outline shape of each of the end portions of the outer electrode 6A has a straight tapered shape) and the outline shape of each of the inclined portions 8B of the outer electrode 6B is linear. In the third embodiment, on the other hand, the outline shape of each of the inclined portions 8AC of the outer electrode 6AC is arcuate, and the outline shape of each of the inclined portions 8BC of the outer electrode 6BC is arcuate. The arcuate portions 8AC and 8BC and associated straight lines may define a trumpet shape.

Fourth Embodiment

Figure 9A:
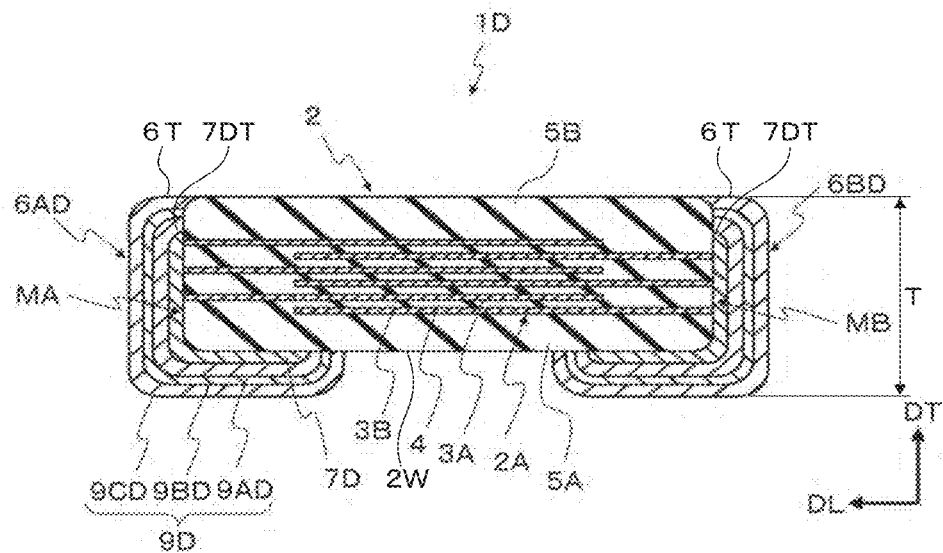
FIG. 9A is a cross-sectional view showing a configuration of a multilayer ceramic capacitor according to a fourth embodiment of the present invention.

A fourth embodiment of the present invention will be described with reference to FIG. 9A. FIG. 9A is a cross-sectional view showing the configuration of a multilayer ceramic capacitor 1D according to the fourth embodiment. Similar reference numerals are used to designate similar or same elements in the first and fourth embodiments.

As shown in FIG. 9A, the multilayer ceramic capacitor 1D includes outer electrodes 6AD and 6BD instead of the outer electrodes 6A and 6B of the multilayer ceramic capacitor 1A of FIG. 2A. Other portions of the multilayer ceramic capacitor 1D may be configured similarly to the multilayer ceramic capacitor 1A.

The outer electrodes 6AD and 6BD are formed on the opposite end faces MA and MB of the element body 2, respectively, such that the outer electrode 6AD is separated from the outer electrode 6BD in the longitudinal direction DL of the capacitor 1D. The left outer electrode 6AD is formed on the left end face MA of the element body 2 and extends therefrom on the lower face 2W, the front face 2F and the rear face 2R of the element body 2. The right outer electrode 6BD is formed on the right end face MB of the element body 2 and extends therefrom on the lower face 2W, the front face 2F and the rear face 2R of the element body 2. The outer electrodes 6AD and 6BD are not formed on the upper face 2T of the element body 2. Other portions of the outer electrodes 6AD and 6BD may be configured similarly to the outer electrodes 6A and 6B.

Each of the outer electrodes 6AD and 6BD includes a underlayer 7D formed on the element body 2, and a plating layer 9D formed on the underlayer 7D. The left underlayer 7D is formed on the left end face MA of the element body 2 and the right underlayer 7D is formed on the right end face MB of the element body 2. The left underlayer 7D is separated from the right underlayer 7D in the longitudinal direction DL of the element body 2. The left underlayer 7D is formed on the left end face MA of the element body 2, and extends therefrom to the lower face 2W, the front face 2F and the rear face 2R of the element body 2. The right underlayer 7D is formed on the right end face MB of the element body 2, and extends therefrom to the lower face 2W, the front face 2F and the rear face 2R of the element body 2. The base layers 7D are not formed on the upper face 2T of the element body 2. In order to prevent each of the plating layers 9 from protruding upward from the upper face 2T of the element body 2, the upper end 7DT of each of the underlayer 7D is lower than the upper face 2T of the element body 2. In this embodiment, the upper end 7DT of each of the underlayers 7D is higher than the uppermost layer of the inner electrode layers 3A and 3B when viewed in the height direction DT.

The plating layer 9D is formed for each of the outer electrodes 6AD and 6BD and covers the underlayer 7D. The plating layer 9D may have, for example, a three-layer structure, which includes a Cu plating layer 9AD formed on the underlayer 7D, an Ni plating layer 9BD formed on the Cu plating layer 9AD, and a Sn plating layer 9CD formed on the Ni plating layer 9BD. Each of the Cu plating layer 9AD, the Ni plating layer 9BD and the Sn plating layer 9CD may be referred to as a sub-layer of the plating layer 9D.

If the underlayer 7D is a sputtered film, the sputtering process may not be applied onto the upper face 2T of the element body 2 such that the outer electrodes 6AD and 6BD are not formed on the upper face 2T of the element body 2.

If a coating film is formed on the element body 2 by a dipping process and the base layer 7D is formed by sintering the coating film, an inhibitor such as silicone may be applied on the upper face 2T of the element body 2 in Step S9 of FIG. 5 and then the dipping process is carried out to prevent the outer electrodes 6AD and 6BD from being formed on the upper face 2T of the element body 2.

There is an alternative way when a coating film is formed on the element body 2 by a dipping process and the base layer 7D is formed by sintering the coating film. Specifically, an additional step may be carried out subsequent to Step 12 of FIG. 5. In this additional step, the outer electrodes 6A and 6B may be removed from the upper face 2T of the element body 2 of the capacitor 1A shown in FIG. 6I by, for example, polishing or etching the outer electrodes 6A and 6B on the upper face 2T of the multilayer ceramic capacitor 1A.

Because the outer electrodes 6AD and 6BD are not formed on the upper face 2T of the element body 2 of the multilayer ceramic capacitor 1D, the upper end 6T of the outer electrode 6AD and the upper end 6T of the outer electrode 6BD do not protrude upward from the upper face 2T of the element body 2. Therefore, it is possible to reduce the height T of the multilayer ceramic capacitor 1D without reducing the capacitance of the multilayer ceramic capacitor 1D.

Fifth Embodiment

Figure 9B:
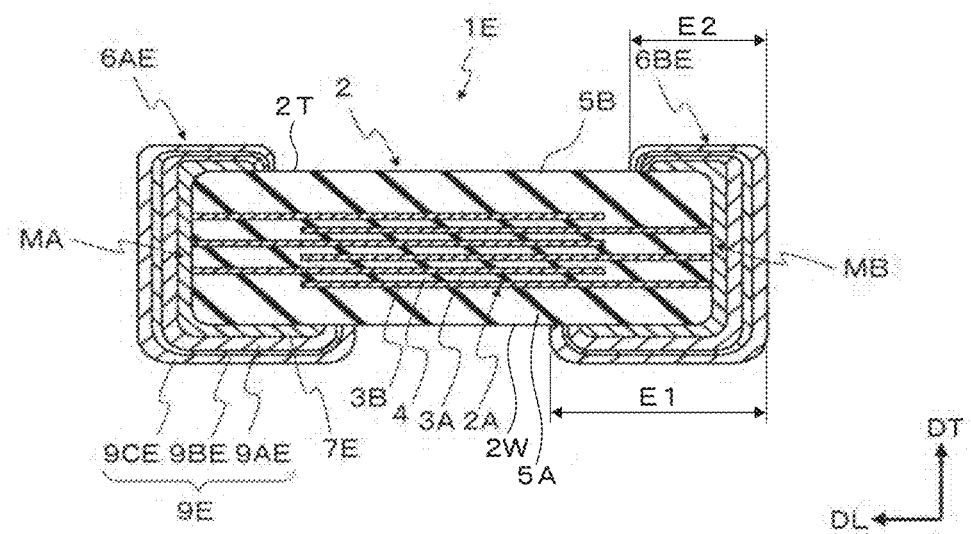
FIG. 9B is a cross-sectional view showing a configuration of a multilayer ceramic capacitor according to a fifth embodiment of the present invention.
Figure 10:
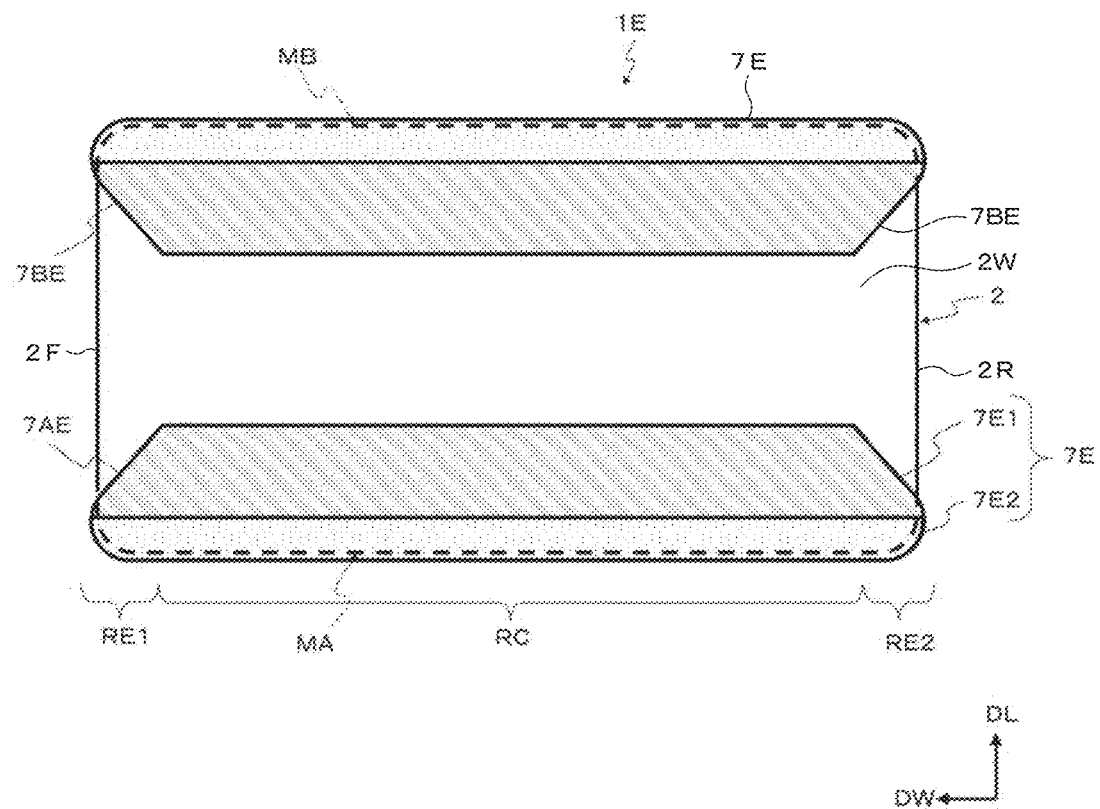
FIG. 10 is a bottom view of the multilayer ceramic capacitor of FIG. 9B, showing patterns of outer electrodes on a lower face of the multilayer ceramic capacitor of the fifth embodiment.

A fifth embodiment of the present invention will be described with reference to FIG. 9B and FIG. 10. Similar reference numerals are used to designate similar or same elements in the first and fifth embodiments. FIG. 9B is a cross-sectional view showing the configuration of a multilayer ceramic capacitor 1E according to the fifth embodiment. The multilayer ceramic capacitor 1E includes an element body 2, outer electrodes 6AE and 6BE, and inner electrode layers 3A and 3B. Each of the outer electrodes 6AE and 6BE has a base layer 7E and a plating layer 9E. FIG. 10 is a bottom view showing the base layers 7 on the lower face 2W of the element body 2 of the multilayer ceramic capacitor 1E. In FIG. 10, each of the end areas RE1 and RE2 of the left base layer 7 has a tapered portion 7AE, and each of the end areas RE1 and RE2 of the right base layer 7 has a tapered portion 7BE.

As shown in FIG. 9B, the multilayer ceramic capacitor 1E includes the outer electrodes 6AE and 6BE instead of the outer electrodes 6A and 6B of the multilayer ceramic capacitor 1A of FIG. 2A. Other portions of the multilayer ceramic capacitor 1E may be configured similarly to the multilayer ceramic capacitor 1A.

The outer electrodes 6AE and 6BE are formed on the opposite end faces MA and MB of the element bodies 2 respectively such that the outer electrode 6AE is separated from the outer electrode 6BE in the longitudinal direction DL of the element body 2. The left outer electrode 6AE is formed on the left end face MA of the element body 2 and extends therefrom to neighboring areas of the upper face 2T, the lower face 2W, the front face 2F and the rear face 2R of the element body 2. The right outer electrode 6BE is formed on the right end face MB of the element body 2 and extends therefrom to neighboring areas of the upper face 2T, the lower face 2W, the front face 2F and the rear face 2R of the element body 2. The length E1 of the outer electrode 6AE, 6BE on the lower face 2W of the element body 2 is longer than the length E2 of the outer electrode 6AE, 6BE on the upper face 2T of the element body 2. The length E (FIG. 2) is also longer than the length E2.

Each of the outer electrodes 6AE and 6BE includes a underlayer 7E formed on the element body 2, and a plating layer 9E formed on the underlayer 7E. The base layers 7E are formed on the opposite end faces MA and MB of the element bodies 2 respectively such that the left base layer 7E is separated from the right base layer 7E in the longitudinal direction DL of the element body 2. The left base layer 7E is formed on the left end face MA of the element body 2 and extends therefrom to neighboring areas of the upper face 2T, the lower face 2W, the front face 2F and the rear face 2R of the element body 2. The right base layer 7E is formed on the right end face MB of the element body 2 and extends therefrom to neighboring areas of the upper face 2T, the lower face 2W, the front face 2F and the rear face 2R of the element body 2.

As shown in FIG. 10, each of the underlayers 7E on the lower face 2W of the element body 2 is a composite film of a sputtered film 7E1 and a sintered film 7E2. In this embodiment, the sputtered film 7E1 does not overlap the sintered film 7E2 when viewed from the bottom of the capacitor 1E. The sintered film 7E2 is made by sintering a coating film, which is formed in advance on the element body 2 by dipping. The underlayers 7E on the remaining five faces of the element body 2 (i.e., the end faces MA, MB, the front face 2F, the rear face 2R and the upper face 2T) include the sintered film 7E2 only. When forming the sputtered film 7E1, a mask used to form the sputtered film 7E1 on the lower face 2W of the element body 2 may have openings corresponding to the pattern (shape) of the underlayer 7E on the lower face 2W of the element body 2 such that the left underlayer 7E has the tapered portions 7AE and the right underlayer 7E has the tapered portions 7BE. By adjusting the dipping depth at the time of forming the coating film on the element body 2, it is possible to prevent the sputtered films 7E1 having the inclined portions 7AE and 7BE from overlapping the sintered films 7E2. In order to cause the underlayer 7E (7E2) on the upper face 2T of the element body 2 to have the length E2, which is smaller than the length E1 and the length E, an inhibitor described above may be applied onto additional areas on the upper face 2T during Step S9 (FIG. 5) so that the underlayer 7E on the upper face 2T is smaller than the under layer 7E on the lower face 2W.

It should be noted that the sintered film 7E2 may be formed prior to forming the sputtered film 7E1. Alternatively, the sputtered film 7E1 may be formed prior to forming the sintered film 7E2. When forming the sintered film 7E2 prior to forming the sputtered film 7E1, the sintering of the coating film, which will become the sintered film 7E2, and the sintering of the element body 2 may be performed simultaneously. It is also possible to make the sputtered film 7E1 from a thin Cu film. When forming the sputtered film 7E1 prior to forming the sintered film 7E2, the sputtered film 7E1 is formed after performing the sintering of the element body 2. Then, the coating film, which will become the sintered film 7E2, is sintered at a lower temperature than the sintering of the element body 2.

If the underlayer 7E only includes the sputtered film, it is necessary to repeat the sputtering process six times. On the other hand, if the underlayer 7 on the lower face 2W of the element body 2 is constituted by the composite film (combination of the sputtered film 7E1 and the sintered film 7E2)

and the underlayer 7 on the remaining five faces MA, MB, 2T, 2F and 2R of the element body 2 is constituted by the sintered film (the sintered coating film that is prepared by dipping), the sputtering process is only needed once and the dipping process is only needed twice. This reduces the number of manufacturing steps.

The plating layer 9E is formed for each of the outer electrodes 6AE and 6BE and covers the underlayer 7E. The plating layer 9E may have, for example, a three-layer structure, which includes a Cu plating layer 9AE formed on the underlayer 7E, an Ni plating layer 9BE formed on the Cu plating layer 9AE, and a Sn plating layer 9CE formed on the Ni plating layer 9BE. Each of the Cu plating layer 9AE, the Ni plating layer 9BE and the Sn plating layer 9CE may be referred to as a sub-layer of the plating layer 9E.

Sixth Embodiment

Figure 11:
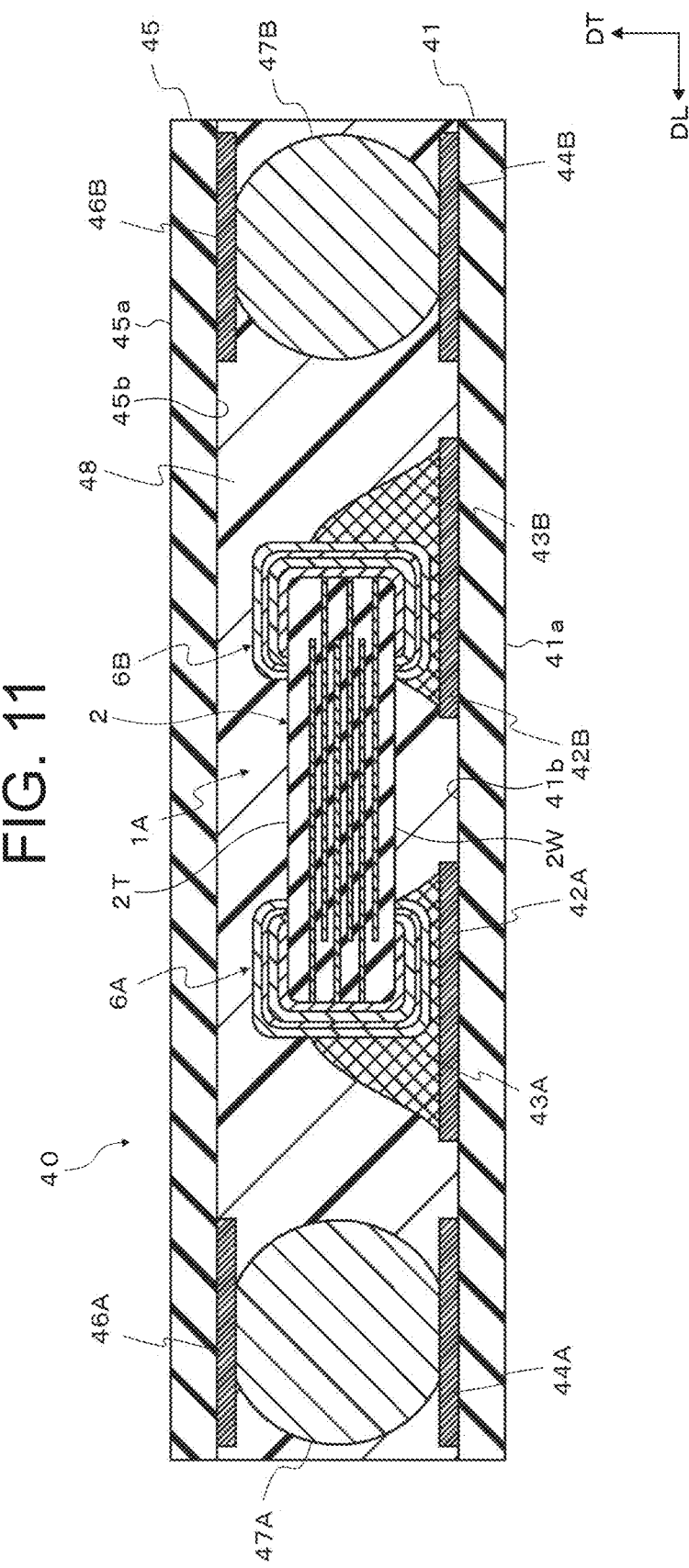
FIG. 11 is a cross-sectional view showing a configuration of a device that includes a mounting board and a multilayer ceramic capacitor mounted on the mounting board according to a sixth embodiment of the present invention.

A sixth embodiment of the present invention will be described with reference to FIG. 11. FIG. 11 is a cross-sectional view showing a configuration of a device 40 according to the sixth embodiment, which includes a lower mounting board 41 and the multilayer ceramic capacitor 1A mounted on the mounting board 41. A combination of the capacitor 1A and the lower mounting substrate 41 is mounted on an upper mounting substrate 45. A combination of the capacitor 1A, the lower mounting substrate 41 and the upper mounting substrate 45 may also be referred to as the device 40. The device 40 may be referred to as a substrate arrangement 40. The upper mounting substrate 45 may be referred to as a motherboard. The lower mounting substrate 41 has an outer face 41a and an inner face 41b. The inner face 41b may be referred to as a back face 41b. The upper mounting substrate 45 has an outer face 45a and an inner face 45b. The inner face 45b may be referred to as a back face 45b. As shown in FIG. 11, four land electrodes 42A, 42B, 44A and 44B are formed on the back face 41b of the mounting substrate 41. The multilayer ceramic capacitor 1A is connected to the land electrodes 42A and 42B through solder layers 43A and 43B, respectively, which are attached to the plating layers 9 of the outer electrodes 6A and 6B. The solder layer 43A wets up to the left face of the outer electrode 6A but does not reach the top face of the outer electrode 6A. The solder layer 43B wets up to the right face of the outer electrode 6B but does not reach the top face of the outer electrode 6B. Solder balls 47A and 47B are formed on the land electrodes 44A and 44B disposed on the back face 41b of the mounting substrate 41, respectively.

It should be noted that although not illustrated in FIG. 11, one or more semiconductor chips are mounted on the outer face 41a of the mounting substrate 41. The semiconductor chip(s) may include a microprocessor, a semiconductor memory, an FPGA (Field-Programmable Gate Array) and/or an ASIC (Application Specific Integrated Circuit).

Land electrodes 46A and 46B are formed on the back face 45b of the upper mounting substrate 45. The upper mounting substrate 45 is connected to the lower mounting substrate 41 via the solder balls 47A and 47B. The upper mounting substrate 45 may be a motherboard, and the substrate arrangement 40 that includes the mounting substrate 41 and the capacitor 1A is mounted on the motherboard 45.

The mounting substrates 41 and 45 are spaced from each other in the height direction DS by the solder balls 47A and 47B. A resin 48 is provided between the mounting substrates 41 and 45 to encapsulate (or seal) the multilayer ceramic capacitor 1A. The resin 48 is, for example, an epoxy resin. The resin 48 may be injected and cured between the mounting boards 41 and 45 after the mounting boards 41 and 45 are connected to each other by the solder balls 47A and 47B. The resin 48 covers the multilayer ceramic capacitor 1A, the solder layers 43A, 43B and the solder balls 47A, 47B, and adheres to the top face 2T of the element body 2.

Because the multilayer ceramic capacitor 1A is mounted on the back face 41b of the mounting substrate 41, the multilayer ceramic capacitor 1A is placed on the opposite face of the mounting substrate 41 when looked at from the semiconductor chip(s) which is mounted on the outer face 41a of the mounting substrate 41. Thus, it is possible to mount the multilayer ceramic capacitor 1A in close proximity to the semiconductor chip(s) mounted on the outer face 41a of the mounting substrate 41, thereby effectively eliminating the noise added to the semiconductor chip(s).

If the height T of the multilayer ceramic capacitor 1A is 100 μm or less, the multilayer ceramic capacitor 1A is received in the spacing between the mounting boards 41 and 45, which are connected to each other via the solder balls 47A and 47B. Thus, it is possible to place the multilayer ceramic capacitor 1A on the inner face 41b of the mounting substrate 41 whereas the semiconductor chips are placed on the opposite face (outer face) 41a of the mounting substrate 41.

If the length L of the multilayer ceramic capacitor 1A is equal to or smaller than 0.4 mm and the width W of the multilayer ceramic capacitor 1A is equal to or smaller than 0.8 mm, it is possible to place the multilayer ceramic capacitor 1A between the spacing between the solder balls 47A and 47B while achieving a decrease in the spacing between the solder balls 47A and 47B.

Seventh Embodiment

Figure 12:
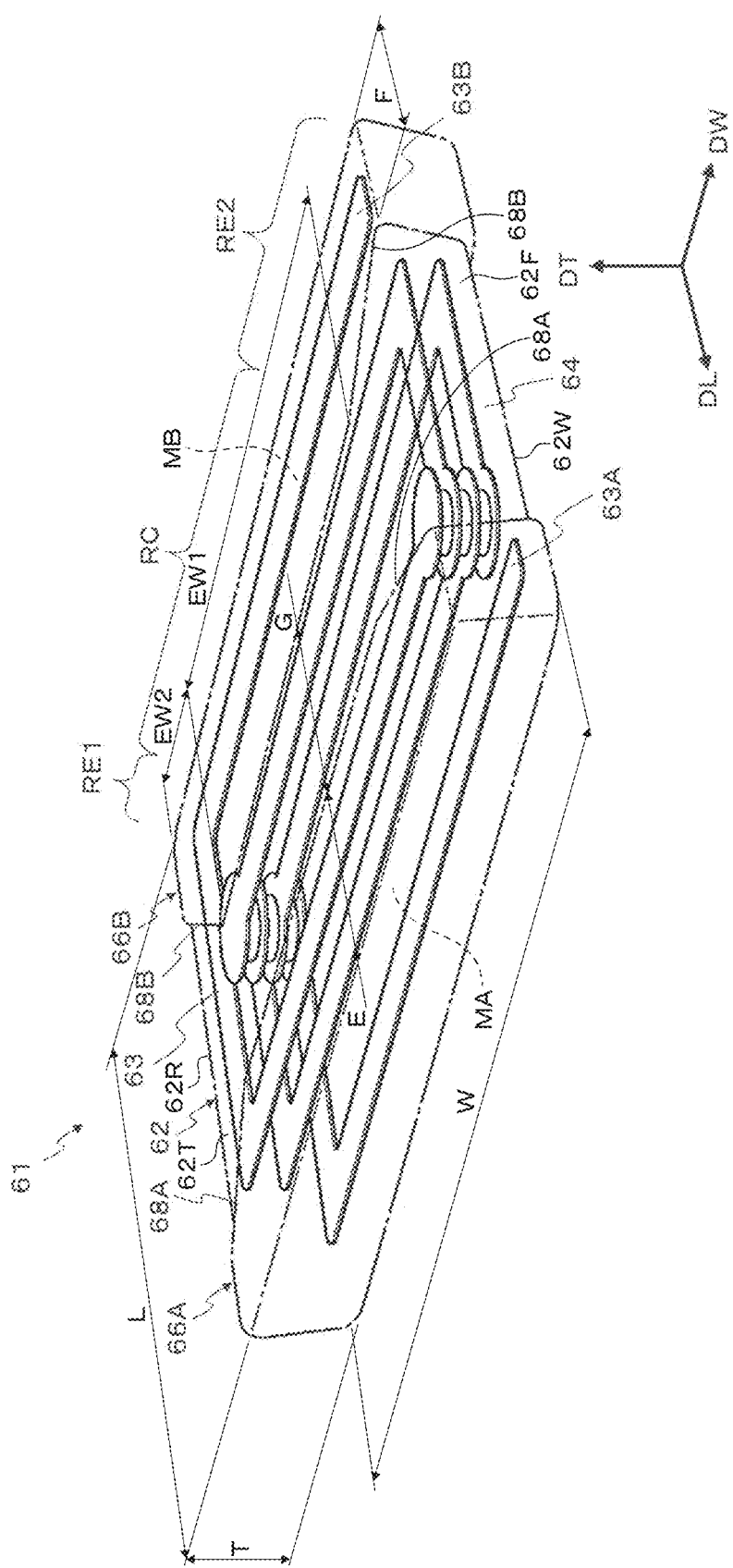
FIG. 12 is a perspective view showing a configuration of a ceramic electronic component according to a seventh embodiment of the present invention.

A seventh embodiment of the present invention will be described with reference to FIG. 12. FIG. 12 is a perspective view showing a configuration example of a ceramic electronic component according to the sixth embodiment. In the sixth embodiment, a chip inductor 61 will be described as an example of the ceramic electronic component.

As shown in FIG. 12, the chip inductor 61 includes an element body 62 and outer electrodes 66A and 66B. The element body 62 includes a coil pattern 63, inner electrode layers 63A and 63B and a magnetic material 64. The magnetic material 64 is used as a dielectric to insulate the inner electrode layers 63A and 63B. The element body 62 may have a substantially rectangular parallelepiped shape. Each of the coil pattern 63 and the inner electrodes 63A and 63B may have a flat plate shape. The coil pattern 63 may be arranged helically in the element body 62. Each of the outer electrodes 66A and 66B has a structure similar to the outer electrode 6A, 6B of the first embodiment (FIG. 1 and FIG. 2A). Specifically, each of the outer electrodes 66A and 66B has a base layer formed on the element body 62 and a plating layer formed on the base layer. The outer electrode 66A has end portions RE1 and RE2 and a middle portion RC between the end portions RE1 and RE2. The outer electrode 66B has end portions RE1 and RE2 and a middle portion RC between the end portions RE1 and RE2. Each of the end portions RE1 and RE2 of the outer electrode 66A has an inclined portion 68A. Each of the end portions RE1 and RE2 of the outer electrode 66B has an inclined portion 68B. The base layer may be made from a combination of a metal and a co-material. The co-material is, for example, a ferrite component that is the main component of the magnetic material 64.

The coil pattern 63 and the inner electrode layers 63A and 63B are generally covered with the magnetic material 64. It should be noted, however, that the left end of the inner electrode layer 63A extends out of the magnetic material 64 from the left end face MA of the element body 62 and connected to the outer electrode 66A. Similarly, the right end of the inner electrode layer 63B extends out of the magnetic material 64 from the other face (right face) MB of the element body 62 and is connected to the outer electrode 66B.

The materials of the coil pattern 63 and the inner electrode layers 63A and 63B may be a metal such as Cu, Ni, Ti, Ag, Au, Pt, Pd, Ta or W, for example, or an alloy containing these metals. The magnetic material 64 is, for example, ferrite.

The outer electrode 66A is provided on the left end face MA of the element body 62 and the outer electrode 66B is provided on the right end face MB of the element body 62. The outer electrode 66A is separated from the outer electrode 66B in the length direction DL of the element body 62. Each of the outer electrodes 66A and 66B is formed on the respective end face MA, MB of the element body 62 and extends therefrom to the front face 62T, the rear face 62R, the top face 62T and the bottom face 62W of the element body 62.

Because the outer electrode 66A has the inclined portions 68A on its end portions RE1 and RE2, respectively, the outer electrode 66A has a similar shape to the outer electrode 6A shown in FIG. 2A when viewed from the top. Specifically, the middle portion RC of the outer electrode 66A has a greater length E than the end portions RE1 and RE2 of the outer electrode 66A in the length direction DL of the element body 62. The length of the end portion RE1, RE2 is measured from the end face MA. Similarly, the middle portion RC of the outer electrode 66B has a greater length E than the end portions RE1 and RE2 of the outer electrode 66B in the length direction DL of the element body 62.

Each of the areas of the front face 62F and the rear face 62R of the element body 62 covered with the outer electrode 66A is denoted by F. In the drawing, the size F represents the size from the end face MA in the direction DL. Each of the areas of the front face 62F and the rear face 62R covered with the outer electrode 66B is also denoted by F. The size F represents the size from the end face MB in the direction DL. The size E is greater than the size F.

On the upper face 62T and lower face 62W of the element body 62, each of the end portions RE1 and RE2 of the outer electrode 66A has the inclined portion 68A. On the upper face 62T and lower face 62W of the element body 62, each of the end portions RE1 and RE2 of the outer electrode 66B has the inclined portion 68B.

If the length of the chip inductor 61 in the length direction DL is represented by L, the width of the chip inductor 61 in the width direction DW is represented by W, the height of the chip inductor 61 in the height direction DT is represented by T, the width of the middle portion RC of the outer electrode 66A, 66B in the width direction DW is represented by EW1 and the width of the end portion RE1, RE2 of the outer electrode 66A, 66B in the width direction DW is represented by EW2, the distance between the middle portion RC of the outer electrode 66A and the middle portion RC of the outer electrode 66B in the length direction DL is represented by G, and the length of the middle portion RC of the outer electrode 66A, 66B in the length direction DL is represented by E, then the chip inductor 61 satisfies the following condition: $L<W$, $L\leq 0.4$ mm, $W\leq 0.8$ mm, $T\leq 100$ μm, $EW2\geq 0.05$ mm, $G/EW1\geq 0.22$ and $E/T\geq 1.25$.

Although the multilayer ceramic capacitor 1A, 1B, 1C, 1D and 1E and the chip inductor 61 are described as examples of the ceramic electronic component in the above-described embodiments, the ceramic electronic component of the present invention may be a chip resistor or a sensor chip. Although the ceramic electronic component having the two outer electrodes is described in the above-described embodiments, the present invention may be applied to a ceramic electronic component having three or more outer electrodes.

EXAMPLES

Actual examples of the multilayer ceramic capacitor will now be described. One thousand examples of the multilayer ceramic capacitor were prepared and evaluated. Each of the multiplayer ceramic capacitor had the following dimensions: the length L was 0.3 mm, the width W was 0.4 mm-0.6 mm, and the height T was 0.05 mm-0.09 mm.

FIG. 13 is a table that shows the dimensions of the multilayer ceramic capacitors, the dimensions of the outer electrodes, occurrence of the short-circuit failure and occurrence of the chip standing failure. The underlayers of the respective outer electrode were the sputtered films.

First, preparation of the actual examples of the multilayer ceramic capacitor will be described below. A plurality of green sheets 24 were prepared using a high dielectric material such as $BaTiO_3$. The thickness of each green sheet 24 was 1 μm. Then, the inner electrode patterns 23 were formed on the green sheets 24 by a printing method. The green sheets 24, on which the inner electrode patterns 23A, 23B were formed, cover sheets 25A, 25B and a green sheet 24A were stacked to obtain a block 25 of these sheets. The green sheet thickness and the number of stacked green sheets were decided such that the thickness T of the resulting multilayer ceramic capacitor would become 0.05 mm-0.08 mm in consideration of the thickness of the plating layer 9 and shrinkage during the sintering of the block 25. The block 25 was cut at predetermined positions to produce a plurality of element bodies 2. The element bodies 2 were sintered at a temperature between 1000 degrees C. and 1400 degrees C.

A mask was placed over the sintered element body 2, and a thin Cu film was formed on the sintered element body by sputtering to prepare underlayers on the element body 2. A portion of the mask on the lower face 2W of the sintered element body 2 was cut out so that the forming portion of the underlayer was hollowed out. The mask was designed such that the length E of the resulting outer electrode became 0.07 mm to 0.12 mm, and the dimension EW2 for providing the tapered portions 8A, 8B became 0 mm to 0.1 mm. The portion of the mask on the upper face 2T of the sintered element body 2 may also be cut out and designed in the same way such the underlayers are provided by forming a thin Cu film on the sintered element body by sputtering. Some portions of the mask on the end face MA, MB of the sintered element body 2, at which the inner electrodes will be exposed, may be cut out to prepare the hollowed out portions for exposing the inner electrodes. A thin Cu film was formed on the end face MA, MB of the element body 2 by sputtering. The thin Cu film was used as the underlayers 7.

The sintered element body 2 having the underlayers 7 thereon underwent an electroplating process to form a plating layer 9 on each of the underlayers 7. The multilayer ceramic capacitor was obtained upon completing the electroplating process.

The capacitor (chip) was taped and mounted on a mounting substrate using a chip mounter. Solder paste was applied in advance on the land electrodes on the mounting substrate. After mounting the capacitor on the mounting substrate, a solder reflow process was applied to connect the outer electrodes of the capacitor to the land electrodes, respectively.

The capacitors after the solder reflow process were subjected to visual inspection and energization tests to see if short-circuiting occurred between the two land electrodes due to rotational misalignment (FIG. 4A), and if the chip standing occurred. The energization test was carried out by supplying electricity to the capacitor to see occurrence of the short-circuiting. As a result of the visual inspection and energization tests, it was confirmed that neither short-circuiting between the land electrodes nor chip standing occurred in the capacitor chips that satisfy the condition of EW2≥0.05 mm, G/EW1≥0.22, and E/T≥1.25.

It will be apparent to those skilled in the art that various modifications and variations can be made in the present invention without departing from the spirit or scope of the invention. Thus, it is intended that the present invention encompasses modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A ceramic electronic component comprising:
   an element body having a first end face, a second end face parallel to the first end face, a top face, a bottom face, a first lateral face, and a second lateral face parallel to the first lateral face, the element body including a dielectric, a first inner electrode exposed at the first end face, and a second inner electrode exposed at the second end face;
   a first outer electrode formed on the first end face, the first outer electrode extending therefrom onto neighboring areas of at least one of the top face, the bottom face, the first lateral face, and the second lateral face of the element body, thereby having an extended portion, and connected to the first inner electrode, the extended portion of the first outer electrode including two side portions and a middle portion between the two side portions such that the middle portion extends inwardly towards a center of the element body more than the two side portions from the first end face in a direction perpendicular to the first end face; and
   a second outer electrode formed on the second end face, the second outer electrode extending therefrom onto neighboring areas of said at least one of the top face, the bottom face, the first lateral face, and the second lateral face of the element body, thereby having an extended portion, and connected to the second inner electrode, the extended portion of the second outer electrode including two side portions and a middle portion between the two side portions such that the middle portion extends inwardly towards the center of the element body more than the two side portions from the second end face in a direction perpendicular to the second end face, wherein the second outer electrode does not overlap the first outer electrode on the element body, and
   wherein the ceramic electronic component satisfies the following conditions:
   L<W,
   L≤0.4 mm,
   W≤0.8 mm,
   T≤100 μm,
   EW2≥0.05 mm,
   G/EW1≥0.22, and
   E/T≥1.25,
   where L represents an outer lengthwise dimension of the ceramic electronic component in the direction perpendicular to the first end face, W represents an outer widthwise dimension of the ceramic electronic component in a direction in parallel to the first end face, T represents an outer height dimension of the ceramic electronic component in a direction perpendicular to the top and bottom faces of the element body, EW1 represents a dimension of the middle portion of the first outer electrode in the direction in parallel to the first end face, EW2 represents a dimension of each of the two side portions of the first outer electrode in the direction in parallel to the first end face, G represents a distance between the middle portion of the first outer electrode and the middle portion of the second outer electrode in the direction perpendicular to the first end face, and E represents a dimension of the middle portion of the first outer electrode in the direction perpendicular to the first end face, as measured from an edge of the first outer electrode on the first end face of the element body.

2. The ceramic electronic component according to claim 1,
   wherein the top and bottom faces of the element body are parallel to the first inner electrode, and the respective extended portions of the first and second outer electrodes are on at least one of the top and bottom faces of the elements body, and
   wherein the ceramic electronic component satisfies following conditions on only one of the top and bottom faces of the element body:
   EW2≥0.05 mm,
   G/EW1≥0.22, and
   E/T≥1.25.

3. The ceramic electronic component according to claim 1, wherein the first inner electrode is provided in a plurality, the second inner electrode is provided in a plurality, and the plurality of first inner electrodes and the plurality of second inner electrodes are alternately laminated in the element body.

4. The ceramic electronic component according to claim 1, further comprising a floating electrode arranged in the element body,
   wherein the first inner electrode does not overlap the second inner electrode in the element body, and
   wherein the floating electrode overlaps the first inner electrode and the second inner electrode.

5. The ceramic electronic component according to claim 1,
   wherein the extended portion of the first outer electrode is on neighboring areas of the top and bottom faces of the element body, and
   wherein the extended portion of the second outer electrode is on neighboring areas of the top and bottom faces of the element body.

6. The ceramic electronic component according to claim 5, wherein the dimension E of the first outer electrode on one of the top and bottom faces of the element body is greater than the dimension E of the first outer electrode on the other of the top and bottom faces of the element body, and the second outer electrode has same dimensions as the first outer electrode on the top and bottom faces of the element body.

7. The ceramic electronic component according to claim 6,
wherein each of the first outer electrode and the second outer electrode on said one of the top and bottom faces of the element body includes a composite film made of a sputtered film and a sintered film, and a plating film formed on the composite film, and
wherein each of the first outer electrode and the second outer electrode on the other of the top and bottom faces of the element body includes a sintered film and a plating film formed on the sintered film.

8. The ceramic electronic component according to claim 1,
wherein the extended portion of the first outer electrode is on a neighboring area of only one of the top and bottom faces of the element body, and
wherein the extended portion of the second outer electrode is on a neighboring area of only one of the top and bottom faces of the element body.

9. The ceramic electronic component according to claim 1, wherein the extended portion of each of the first and second outer electrodes has a tapered shape such that a width thereof is progressively narrowed towards the center of the element body.

10. The ceramic electronic component according to claim 1,
wherein the first outer electrode includes a first underlayer formed on the element body and connected to the first inner electrode, the first underlayer containing a metal, and a first plating layer formed on the first underlayer, and
wherein the second outer electrode includes a second underlayer formed on the element body and connected to the second inner electrode, the second underlayer containing a metal, and a second plating layer formed on the second underlayer.

11. A device comprising:
a mounting substrate having a first face and a second face that is opposite to the first face, the mounting substrate including a first land electrode and a second land electrode on the first face; and
the ceramic electronic component as set forth in claim 1, mounted on the first face of the mounting substrate such that the first land electrode is connected to the first outer electrode of the ceramic electronic component via a first solder layer and that the second the second land electrode is connected to the second outer electrode of the ceramic electronic component via a second solder layer.

12. The device according to claim 11, wherein a distance between the first land electrode and the second land electrode is equal to a distance between the middle portion of the first outer electrode and the middle portion of the second outer electrode.

13. The device according to claim 11, further comprising a solder ball formed on the first face of the mounting substrate.

14. The device according to claim 13, further comprising another mounting substrate that is connected to the mounting substrate by the solder ball such that a gap is formed between said another mounting substrate and the mounting substrate to receive the ceramic electronic component in the gap.

* * * * *